US007376621B1

(12) United States Patent
Ling

(10) Patent No.: US 7,376,621 B1
(45) Date of Patent: May 20, 2008

(54) METHOD AND APPARATUS FOR CONDUCTING ELECTRONIC COMMERCE TRANSACTIONS USING ELECTRONIC TOKENS

(75) Inventor: Marvin T. Ling, Scottsdale, AZ (US)

(73) Assignee: Paybyclick Corporation, Phoenix, AZ (US)

( * ) Notice: Subject to any disclaimer, the term of this patent is extended or adjusted under 35 U.S.C. 154(b) by 987 days.

(21) Appl. No.: 09/665,237

(22) Filed: Sep. 18, 2000

Related U.S. Application Data

(63) Continuation-in-part of application No. 09/553,695, filed on Apr. 21, 2000, now Pat. No. 7,177,838.

(60) Provisional application No. 60/178,239, filed on Jan. 26, 2000.

(51) Int. Cl.
*G06Q 40/00* (2006.01)
(52) U.S. Cl. .......................................... 705/41; 705/30
(58) Field of Classification Search ............. 705/26–44
See application file for complete search history.

(56) References Cited

U.S. PATENT DOCUMENTS

| | | | |
|---|---|---|---|
| 4,802,218 A | 1/1989 | Wright et al. .................. 380/23 |
| 4,977,595 A | 12/1990 | Ohta et al. ..................... 380/24 |
| 5,010,485 A | 4/1991 | Bigari .......................... 364/408 |
| 5,224,162 A | 6/1993 | Okamoto et al. ............. 380/24 |
| 5,287,269 A * | 2/1994 | Dorrough et al. ............. 705/17 |
| 5,305,383 A | 4/1994 | Guillou et al. ................ 380/24 |
| 5,539,825 A | 7/1996 | Akiyama et al. ............. 380/24 |
| 5,655,023 A | 8/1997 | Cordery et al. ............... 380/51 |
| 5,671,364 A | 9/1997 | Turk .......................... 395/239 |
| 5,815,657 A * | 9/1998 | Williams et al. ............ 713/200 |

(Continued)

FOREIGN PATENT DOCUMENTS

WO     WO 01/42946 A2    6/2001

OTHER PUBLICATIONS

"Ambalink Universal News Services Limited", Universal News Services, PR Newswire, London Jun. 8, 1999.*
O'Mahony et al., "Electronic Payment Systems," 1997, pp. 191-212.

(Continued)

*Primary Examiner*—Frantzy Poinvil
(74) *Attorney, Agent, or Firm*—Franco A. Serafini; Michael J. DeHaemer, Jr.; Luce, Forward, Hamilton & Scripps LLP

(57) ABSTRACT

Methods and apparatus for conducting electronic commerce using electronic tokens are described. The electronic tokens are issued and maintained by a vendor, who also provides products and services that can be purchased or rented using the electronic tokens. The electronic tokens may be purchased from the vendor either on-line, using a credit card, or off-line, using a check, money order, purchase order, or other payment means. Because the vendor is the issuer of the electronic tokens, there is no need for transactions to be handled by a third party, such as a bank or other organization. This reduces the overhead involved in conducting electronic commerce, and provides the vendor with a greater amount of control. Additionally, the vendor maintains total control over the price of the electronic tokens at any time. For vendors who offer software products for sale or rental, use of electronic tokens makes a variety of rental arrangements practical including rental for short periods of time, for a specific number of uses, or for a specific number of processing.

25 Claims, 16 Drawing Sheets

U.S. PATENT DOCUMENTS

| | | | | |
|---|---|---|---|---|
| 5,832,089 | A | 11/1998 | Kravitz | 380/24 |
| 5,943,424 | A | 8/1999 | Berger et al. | 380/25 |
| 5,966,699 | A * | 10/1999 | Zandi | 705/38 |
| 5,983,207 | A | 11/1999 | Turk et al. | 705/39 |
| 6,047,268 | A * | 4/2000 | Bartoli et al. | 705/35 |
| 6,236,981 | B1 * | 5/2001 | Hill | 705/67 |
| 6,449,601 | B1 * | 9/2002 | Friedland et al. | 705/37 |
| 6,473,740 | B2 | 10/2002 | Cockrill et al. | |
| 6,493,683 | B1 * | 12/2002 | David et al. | 705/37 |
| 2003/0145234 | A1 | 7/2003 | Stangel | |

OTHER PUBLICATIONS

"Payment mechanisms designed for the Internet," printed from the Internet at http://ganges.cs.tcd.ie/mepeirce/Project/oninternet.html, on Oct. 23, 2000.

"FC '97 Papers," Rafael Hirschfeld (Ed.), Feb. 1997, printed from the Internet at http://www.arraydev.com/commerce/jibc/9704-30.htm, on Oct. 20, 2000.

"Networked payment mechanisms & digital cash," printed from the Internet at http://inf2.pira.co.uk/top033.htm, on Oct. 20, 2000.

"Small change: Micropayment," printed from the Internet at http://www2.computerworld.com/home/features.nsf/All/980223micropaylinks, on Oct. 23, 2000.

"A plan for the Introduction of Internet Cash," printed from the Internet at http://www.jim.com/jamesd/kong/plan.htm, on Oct. 20, 2000.

http://www.internetdollar.com, printed from the Internet on Oct. 20, 2000.

"Micropayment methods," printed from the Internet at http://www.transaction.net/payment/micro.html, on Oct. 20, 2000.

http://www.ecoin.net, printed from the Internet on Oct. 20, 2000.

"Scaleable, Secure Cash Payment for WWW Resources with the PayMe Protocol Set," printed from the Internet at http://ganges.cs.tcd.ie/mepeirce/Project/Payme/Overview.html on Oct. 23, 2000.

* cited by examiner

| | | | [HOME][BACK][FORWARD][LAST] |
|---|---|---|---|
| 601 Summary List and Description of selected software categories, each with availability in purchase or rent | | | |
| Document Raster Editing | For Purchase | For Rent/ Time | For Rent/# of times of use | For Rent/ # of Processings |
|---|---|---|---|---|
| Software A | [X] | [ ] | [ ] | [ ] |
| Software B | [X] | [X] | [ ] | [ ] |
| Software C | [X] | [ ] | [X] | [ ] |
| Software D | [ ] | [ ] | [ ] | [X] |

602 brackets the Rent columns; 603 brackets the data rows.

[QUIT]　　　　　　　　　　　　　　　　　　　605　604 [BACK][PROCEED]

[HOME][BACK][FORWARD][LAST]

User selected software summary description & cost        Detailed Information:

701 {
   Product            Type of Purchase     # of Tokens     [ Yes ]
   [X] Software A      Purchase         100                        }—703

[X] Software D      For Rent
                       # Processings     # of Tokens     [ Yes ]

702 {
       [ ]  Up to 100          10
       [X]  101 - 1,000        80
       [ ]  1,001-10,000     600      704

Do you have Software D installed on your computer? [X] Yes [ ] No

Total # of tokens required RT: <u>180</u>. User AT: <u>500</u>. Remaining AT if purchased: <u>320</u>
                     705           706                      707

[QUIT]                                                    [BACK][ORDER]
710                                                        709    708

| | [HOME][BACK][FORWARD][LAST] |
|---|---|
| Customer order confirmation | |
| You have ordered the following software products: | |

| Product | Type of Purchase | Tokens Required |
|---|---|---|
| Software A | Purchase | 100 |
| Software D | For rental use to process 1,000 times | 80 |
| | Total # tokens required for this purchase | 180 |

You already have Software D installed on your computer.
1. We will download Software A with permanent authorization code.
2. We will download a new authorization code for the addition of 1,000 processings for Software D.

| Total tokens required RT | User AT | New AT |
|---|---|---|
| [180] | [500] | [320] |
| 801 | 802 | 803 |

| [QUIT] | [BACK] | Click here if OK: [ORDER CONFIRMED] |
|---|---|---|
| 806 | 805 | 804 |

FIG. 9

[HOME][BACK][FORWARD][LAST]

Basic Token Price: 10 cents

| Product | 700 | # of Tokens | 800 | Cash Price |
|---|---|---|---|---|
| Product A | | 1,000 | | $100.00 |
| Product B | | 58 | | $ 5.80 |
| Product C | | 750 | | $ 75.00 |

900    901
Do you want to purchase using tokens or credit card? [X] Token [ ] Credit Card

[QUIT]                                                    [BACK][ORDER]

Figure 16

METHOD AND APPARATUS FOR CONDUCTING ELECTRONIC COMMERCE TRANSACTIONS USING ELECTRONIC TOKENS

RELATED APPLICATIONS

This application claims priority from U.S. patent application Ser. No. 09/553,695, filed Apr. 21, 2000 now U.S. Pat. No. 7,177,838, and from U.S. provisional application Ser. No. 60/178,239, filed Jan. 26, 2000.

FIELD OF THE INVENTION

The present invention relates to methods and apparatus for conducting electronic commerce using electronic tokens. More particularly, the present invention provides a means to purchase, rent, or extend the rental period on software or other products and services using electronic tokens, which may be purchased either on-line or off-line.

BACKGROUND OF THE INVENTION

Electronic commerce using the World Wide Web (Web) is exploding in growth. Many Web sites have been developed through which Web service providers may advertise and offer a variety of products for sale. As electronic commerce becomes popular, increasing numbers of vendors are offering a variety of products and services on the Web. Among these vendors are software vendors, known as application service providers (ASPs), who provide software for sale or rental over the Web.

Software products being offered by an ASP are typically displayed at the purchaser's client computer. The display may include a description of each software program and a price for the software. As the purchaser sends a request to purchase software programs to the ASP server, the server must interact with the client system to confirm the purchases and the payment method. When the ASP server accepts the purchase order and the payment method, the ASP server will download the software product electronically to the purchaser's client computer. To prevent unauthorized use of the software product, each software product is typically protected by encryption, usually referred to as a software lock (or key).

Upon successful completion of the purchase transaction, the ASP will download a decrypted version of the software or an authorization code which will "unlock" the software for the purchaser if the software being purchased is already installed on the purchaser's client computer. The latter situation may exist if the rental period of the software product has expired and the purchaser wishes to extend its use.

Since some software products are relatively expensive or use of a particular software product may become obsolete after a period or number of uses by a purchaser, the purchaser may want to rent the software product instead of purchasing it outright. Thus, the software may be rented for use for a certain period of time or for a certain number of uses. For example, it may be preferable to rent computer games rather than purchase them, since computer games often lose their interest and appeal after repeated playing. Additionally, a purchaser may wish to rent the use of a software program that is used only occasionally, such as a language translator or document clean-up or editing software. The rental of software thus provides users a relatively inexpensive and economic method to use software.

When a user finds that he is using a piece of rented software repeatedly, it may be desirable to extend the rental period, or to convert rented software to permanent use. An ASP may, therefore, offer users the ability to purchase additional uses of a software product, extend the rental period of a software product, or convert rented software to permanent use. These operations are typically achieved by sending the user new authorization codes or keys that enable the software to continue operation until the new number of uses or time period has expired. By providing only a new authorization code or key, the ASP avoids having to re-download the software to the user's computer.

As the use of an ASP becomes more popular, the interaction between purchaser client computers and ASP servers will become much more frequent. Therefore, it will be desirable for ASPs to provide their purchasers the convenience of minimizing the requirement for interaction between a client computer and the ASP server in order to complete the purchasing or rental transaction, as the case may be. It would also be desirable for ASPs to minimize or limit the frequency of asking the purchaser to transmit the user's private, sensitive information, such as credit card information. Although the purchaser's credit card number is encrypted during the transmission, it will be highly desirable to minimize its exposure through the Web.

Additionally, some software rentals may have a very low cost. For example, renting a single page use of a translation package may cost less than the typical fees associated with processing credit card transactions. Such "micropayment" transactions, sometimes amounting to only fractions of a cent, may also occur in the context of providing access to media, or Web-based services, such as search engines. In each of these cases, it is necessary to provide a way for users to pay for such transactions without incurring the overhead of a credit card charge.

Similar demands are present for vendors of products and services other than software. While there may be many consumers on the Web interested in purchasing or renting a wide variety of products and services, many of these consumers are either unwilling to take the risk of using their credit card over the Internet, or do not possess a credit card that may be used to make purchases on the Web. Additionally, some products and services available over the Web are small enough in cost that they do not justify the overhead of handling credit card transactions.

To address these concerns, various forms of electronic currency have been developed and marketed by numerous companies. For example, eCash Technologies Incorporated, of Bothell, Wash., offers a product called "eCash", which relies on encryption and digital signature technology to permit selected "eCash" banks to issue "eCash" currency to users, which may be spent on the Web sites of vendors who will accept this "eCash". These vendors may then exchange the "eCash" for traditional money through an "eCash" bank. The use of "eCash" permits micropayments, and permits users to purchase products and services on the Web without using a credit card.

The "eCash" system, and other similar systems, eliminate the need to use a credit card for each on-line transaction, and permit micropayments. Such systems require that users and merchants make arrangements with authorized banks, and require both the user and the merchant to convert between real currency and electronic currency through an authorized bank.

Another system is provided by RocketCash Corporation, of Mountain View, Calif. The RocketCash system sets up accounts for teens who do not have credit cards, and permits their parents to add money to the accounts using checks, money orders, or credit cards. A teen may then shop on the Web, and have the purchases billed to his or her RocketCash account. This eliminates the need for credit cards, but does not address micropayments. Additionally, it is still necessary to establish and fund an account with a single central entity (i.e. RocketCash Corporation) before goods may be purchased.

InternetCash Corporation, of New York, N.Y., offers a similar product, called InternetCash™, based on pre-paid card that is purchased in pre-determined denominations from a store, and may be used at selected on-line merchants. The InternetCash™ system can handle transactions smaller than will be processed by most credit cards, and provides a means to anonymously purchase items on the Internet, without using a credit card. Like other previously known electronic currency systems, InternetCash™ requires merchants to obtain payment from a central organization.

Another electronic currency, called "Beenz", is provided by Beenz.com, Inc., of New York, N.Y. The "beenz" system permits registered users to earn "beenz" currency as an incentive for visiting particular Web sites, shopping on-line at particular Web sites, and other on-line activity. The currency "earned" by these activities may be spent at selected Web vendors. This system, while it does not use a credit card, and may be used for micropayments, is not well suited to more general use, as there is no way to purchase the "beenz" currency. Additionally, as in the other examples cited above, vendors must rely on a single organization to receive payment in real money.

Numerous patents on electronic currency have been issued. Among these are U.S. Pat. No. 5,983,207, to Turk et al., and U.S. Pat. No. 5,671,364, to Turk, which discuss electronic currency systems based on gold or some other commodity held at a central location. U.S. Pat. No. 4,977,595, to Ohta et al., describes cryptographic techniques that may be used by a bank to issue electronic cash. Like the other systems described hereinabove, the methods described in these patents use central organizations, such as banks, to manage user accounts and to handle transactions.

Such systems necessarily impose overhead, in that both the vendors who accept these various forms of electronic currency, and the users who buy items in exchange for electronic currency must deal with a central organization, such as a bank. Additionally, since the central organization controls the issuance of the electronic currency, the vendors who accept the electronic currency have no control over the value of the electronic currency, its sale price, the terms on which it may be bought, or to whom the electronic currency is sold. For example, it is not possible using such systems for a vendor of products or services to agree with his customer on payment terms for electronic currency that will be used to purchase goods, since the customer must pay a bank or other third-party organization for the electronic currency.

In view of the above, it would be desirable to provide apparatus and methods that permit a variety of payment options, such as credit card purchases, checks, money orders, or purchase orders to be used to purchase electronic currency or tokens.

It would also be desirable to provide electronic currency or tokens that may be issued and used with minimal overhead, and that do not require on-line communication with a bank or other organization to issue or use the tokens.

It would further be desirable to provide apparatus and methods that give a vendor complete control over the sale and distribution of electronic currency or tokens that may be used to purchase products and services from that vendor.

SUMMARY OF THE INVENTION

It is an object of the present invention to provide apparatus and methods that permit a variety of payment options, such as credit card purchases, checks, money orders, or purchase orders to be used to purchase electronic currency or tokens.

It is also an object of the present invention to provide electronic currency or tokens that may be issued and used with minimal overhead, and that do not require on-line communication with a bank or other organization to issue or use the tokens.

It is a further object of the present invention to provide apparatus and methods that give a vendor complete control over the sale and distribution of electronic currency or tokens that may be used to purchase products and services from that vendor.

These and other objects of the present invention are achieved by providing apparatus and methods that permit a vendor to directly issue electronic tokens that may be used to purchase products and services from that vendor. A Web site maintained by the vendor is provided with the added ability to sell electronic tokens to users of the Web site in exchange for payment in a variety of forms. Electronic tokens purchased from the vendor are kept in a user account in a database that is maintained by the vendor.

Because the vendor himself is the issuer of the electronic tokens, he may choose to issue the tokens in exchange for any form of payment that he is willing to accept. The methods and apparatus of the present invention support both on-line payment (e.g., using a credit card), and off-line payment (e.g., using a check, money order, or purchase order) for electronic tokens.

The vendor lists the prices of products and services offered on his Web site in terms of electronic tokens. Because the vendor is the issuer of the electronic tokens, in formulating these prices, he may set the value of the tokens to any level that he chooses.

Users purchase or rent products and services from the vendor's Web page using the electronic tokens. After a user chooses a list of products or services that he would like to purchase or rent, the system of the present invention checks to see if the user's account contains a sufficient number of tokens to complete the purchase. If there are enough tokens in the user's account, the tokens used for the purchase or rental are subtracted from the user's account, and the purchase or rental may proceed. Otherwise, the user is given an opportunity to purchase additional tokens to cover the price of the products and services he desires.

If the vendor is an application service provider (ASP) who sells software for download, the methods and apparatus of the present invention permit the software to be purchased, or rented for a variety of terms using electronic tokens. Software may be rented for a particular time period, a number of uses, or a number of processings. Each of these forms of rental may be initiated or extended in exchange for electronic tokens. Extension of a software rental, in which the rented software is already installed on the user's computer, requires only that the user download a new authorization code for the software, rather than downloading the entire software application.

The present invention also provides methods for transferring electronic tokens between users. Additionally, methods are provided for handling purchases on an auction site using electronic tokens issued by the auction site.

It is also an object of the present invention to provide the apparatus and methods permitting a user registered at one vendor Web Site using electronic tokens to purchase products or services from another vendor Web Site that also uses electronic tokens for business transactions.

It is also an object of the present invention to permit a user registered at a vendor Web Site that sets electronic tokens at one value to purchase products or services offered by another vendor Web Site that sets different values for his electronic tokens.

Further, it is an object of the present invention to provide an apparatus and methods to keep accurate records of electronic tokens transferred and converted from one vendor's Web Site to another vendor's Web Site. Therefore, the system would allow one vendor to pay the other vendor the value of the electronic token so transferred and converted.

It is another object of the present invention to provide an apparatus and methods to supply one vendor's user's name, address and other information necessary to another vendor's Web Site. This would permit the user of one vendor to automatically register with another vendor's Web Site, providing the convenience for the user that he is not required to register with another vendor's Web Site.

It is another objective of the present invention to keep a record of tokens already paid, tokens to be paid and free tokens issued. This allows the vendor to further issue free tokens for a user with many paid tokens, as if he is earning interest on the paid but unused tokens. Furthermore, free tokens issues are, in general, intended for a user to purchase additional products and services from the issuing vendor, not for transferring to another vendor. Keeping a record of free tokens issued allows a vendor to prevent such transfer.

It is yet another objective of the present invention that the vendor may display the cost of products or services offered at his Web Site in terms of electronic tokens simultaneously in equivalent cash values in order to assist the user to associate the cost of the corresponding product or service more easily. Furthermore, it is yet another objective of the present invention that the user may choose to purchase items and services using electronic tokens or credit card.

Since the vendor using tokens has complete control to set the price of each token and to issue free tokens under various conditions, the vendor mall itself is a "closed system." The MSP of the method and system, as invented, serves to connect various vendors, allowing a user to purchase products and services from any member vendor malls. Therefore, it is clear to say that the method and system invented here makes a group of "closed systems" and creates an "open system."

BRIEF DESCRIPTION OF THE DRAWINGS

The above and other objects and advantages of the present invention will be apparent upon consideration of the following detailed description taken in conjunction with the accompanying drawings, in which like characters refer to like parts throughout, and in which:

FIG. 7 is an example screen from an application service provider, showing various types of software rental or purchase that are available;

FIG. 8 is an example screen from an application service provider, showing an order list containing software rentals and purchases that have been selected by a user, to be paid for using electronic tokens;

FIG. 9 is an example screen from an application service provider, verifying the user's order;

FIG. 16 is a sample web page where prices for items offered for sale are listed in electronic tokens and equivalent cash value. Also, it displays a choice for the user to make the purchase either in electronic tokens or by credit card.

DETAILED DESCRIPTION OF THE INVENTION

Figure 1:
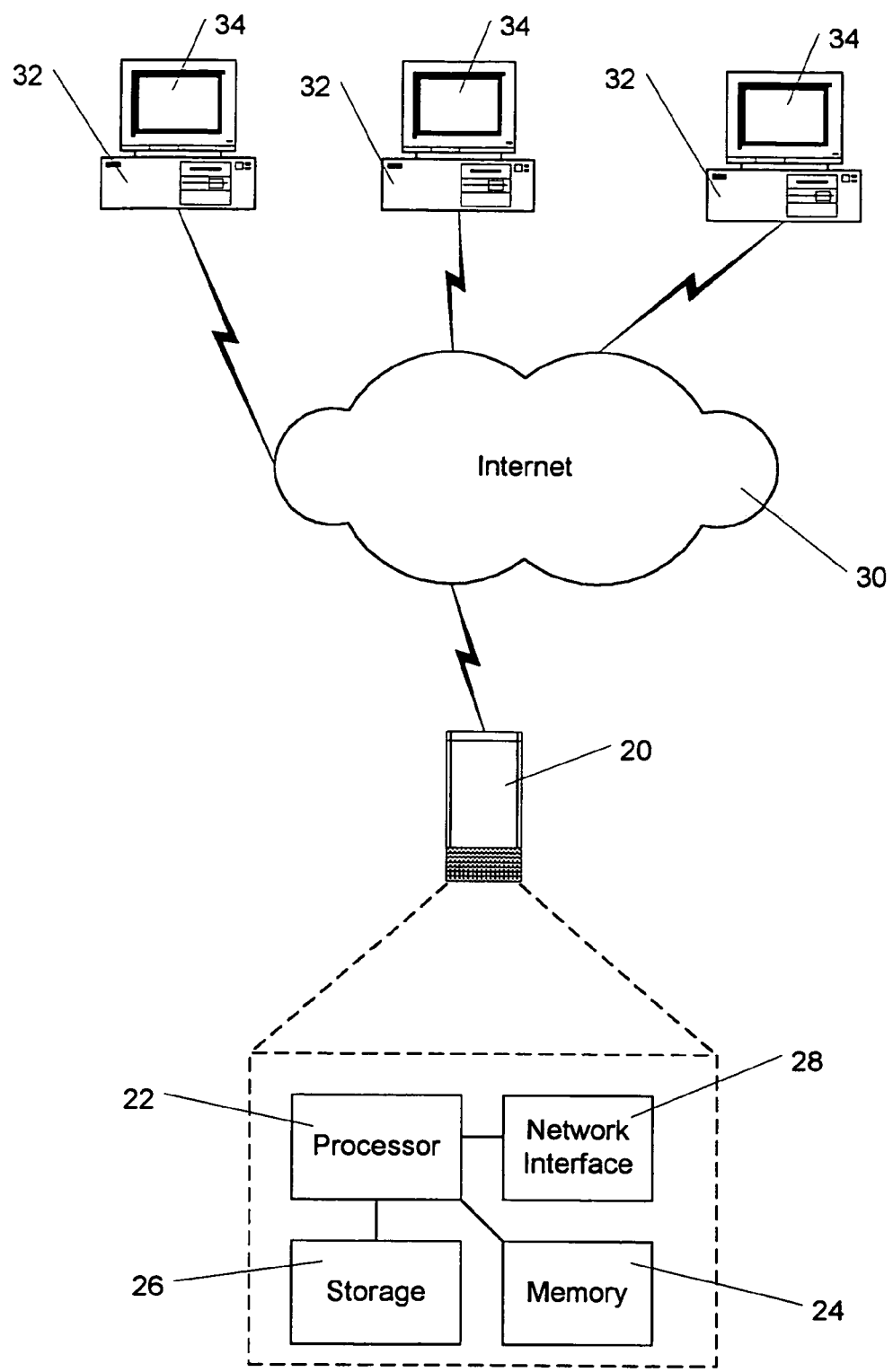
FIG. 1 is an overview of the networked environment in which the methods and apparatus of the present invention are used.

The present invention provides a method and system for conducting business transactions in a networked environment using "electronic tokens" (or "tokens") as a price for each item or product being offered for sale or rental by a vendor. As a user creates his order list, the total number of tokens required (RT) is constantly updated and displayed together with the user's available tokens (AT). To complete the business transaction, the user can simply click on order and order confirmed buttons on the display. The total number of tokens used for purchases are subtracted from the user's available tokens (AT) which is also updated and displayed at the client computer.

Since electronic tokens are used for the business transaction, the need to transmit the user's credit card number and other personal sensitive information between the user's computer and the vendor's computer for each transaction is eliminated. Thus, the method and system of the present invention provides users the convenience of minimizing interactions between the user's computer (the client computer) and the vendor's computer (the server) thus reducing overhead. Furthermore, security for the user's personal sensitive information is improved.

Additionally, since the electronic tokens are issued directly by the vendor of the software or other products and services on which the tokens may be spent, rather than by a bank or other centralized organization, the vendor retains control over issuing and redeeming the tokens. The vendor is able to make whatever arrangements he or she desires for payment for the tokens, including both on-line (e.g. credit card) and off-line (e.g. check, purchase order, billing) transactions. It should be noted that as used herein, a vendor includes any subsidiaries, affiliates, and other corporate entities or persons authorized by the vendor to issue tokens.

The methods and system of the present invention do not require that any payment be made using the user's credit card. Of course, the user has the option of using a credit card to purchase tokens using the on-line method, but may avoid use of a credit card by using the off-line method for purchasing tokens. Because the user need not use a credit card for his purchases, it is unnecessary for the user to have a credit card, or for the user's computer or the vendor's computer to interact over the network with a bank or other financial institution to process credit card transactions. Additionally, since orders can be handled without credit card transactions, the overhead associated with such transactions can be reduced or eliminated, permitting micropayments. Further, since small purchases are paid for in tokens, the vendor need not send out an invoice or incur other overhead involved in handling financial transactions with small purchases.

A further benefit of using the vendor-issued electronic tokens of the present invention is that privacy risks are decreased. Since all purchases or business transactions are done using tokens, very little or no personal sensitive information, such as the user's credit card number, need be transmitted over communication lines, such as the Internet. Although information transmitted via the Internet may be encrypted, it is still desirable to eliminate or minimize such transmissions, since they may be intercepted and decrypted. Furthermore, since the vendor and user interact directly for the purchase and use of electronic tokens, rather than relying on a third party such as a bank, users may be selective about which vendors they are willing to trust with their private information.

It will be apparent to one of ordinary skill in the relevant arts that although the electronic tokens described herein may be of a single denomination, multiple denominations of electronic tokens could be provided. For example, a vendor may offer "silver" tokens, having a unit value, and "gold" tokens, having a value of ten "silver" tokens. The vendor may optionally price the various denominations of electronic tokens however he chooses. For instance, in the example given above, the "silver" tokens may be priced at ten cents each, while the "gold" tokens are priced at ninety-five cents each, giving the user a discount for purchasing "gold" tokens.

Referring now to FIG. 1, the networked environment and apparatus of the present invention are described. Server computer 20 is controlled by a vendor who offers products and services for sale or rental over a network, such as the Internet. Server computer 20 includes processor 22, memory 24, storage 26, and network interface 28. In a preferred embodiment, server computer 20 executes Web server software, through which products and services are offered for sale or rental, and software for issuing and handling electronic tokens, which are used to pay for the products and services. Additionally, server computer 20 may execute database software, which stores information on products and services for sale or rental, and information about users and their accounts for storing electronic tokens. If the vendor is selling or renting software over the network, server computer 20 may execute software that issues authorization codes for use of the software that is being sold or rented.

It will be understood by one skilled in the art that the functions performed by server computer 20 may alternatively be performed by several computers controlled by the vendor. In situations where the vendor is handling a high volume of orders over the network, it may be necessary to distribute the tasks performed by server computer 20 among several computers for performance reasons.

Server computer 20 is connected to network 30 through network interface 28. Network 30, preferably the Internet, is a communication network that connects server computer 20 to one or more client computers 32. Each of client computers 32 is operated by a user who may connect with server computer 20 through network 30 for the purpose of purchasing or renting products and services from the vendor who controls server computer 20. Each of client computers 32 includes a processor (not shown), memory (not shown), and a display 34. Each of client computers 32 preferably executes Web browser software, or other software that permits client computers 32 to communicate with server computer 20. Client computers 32 may also execute software that handles authorization codes for software products that are purchased or rented from the vendor who operates server computer 20.

Figure 2:
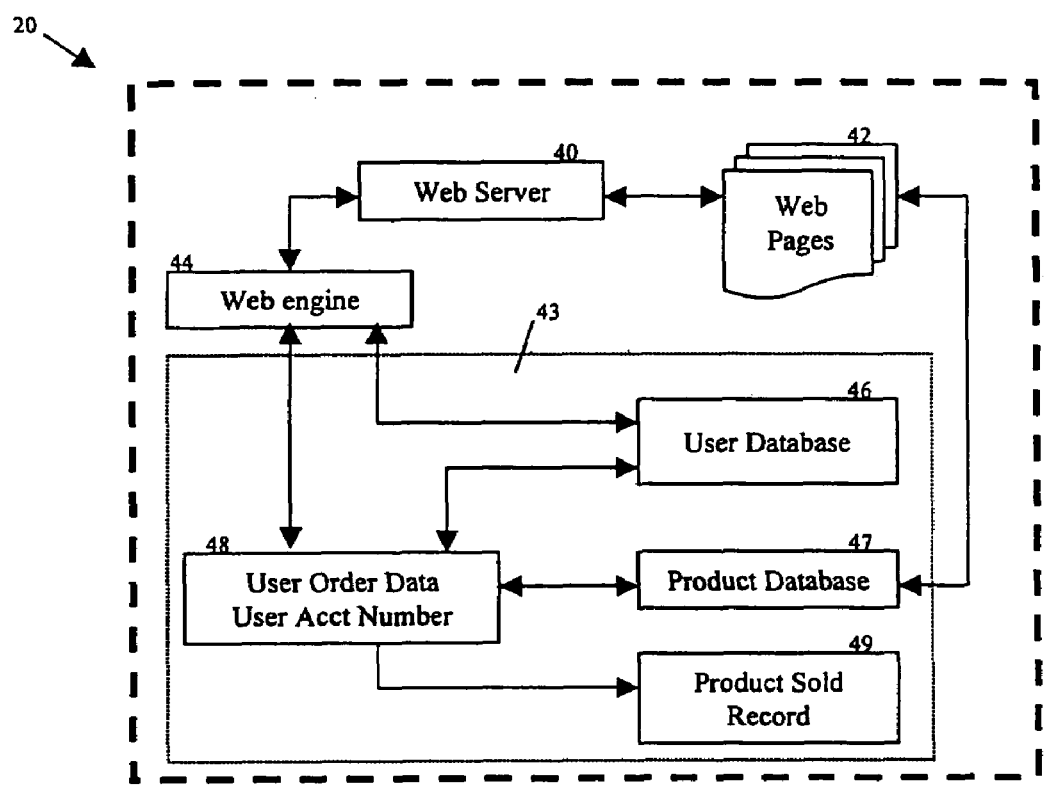
FIG. 2 is a diagram of the software executing on a server built in accordance with the principles of the present invention.

Referring now to FIG. 2, the software executing on server computer 20 is described in greater detail. In a preferred embodiment, server computer 20 executes Web server 40, which communicates across the Internet with numerous Web browsers to provide access to Web pages 42. Web pages 42 may be predefined static Web pages, or may include Web pages that are dynamically generated, using CGI scripts, servlets, or any other technology that permits a Web server to dynamically generate or modify Web pages. For example, Web pages 42 may be generated to contain information on products extracted from products database 47.

Server computer 20 also executes Web engine 44, which handles electronic tokens, as described in detail hereinbelow. Web engine 44 communicates between Web server 40 and database server 43 to handle data on users, user accounts, and other data concerning electronic tokens and users.

Server computer 20 also executes database server 43, which maintains user database 46, product database 47, user order and account number data 48, and product sold records 49. Database server 43 may also manage other databases and tables (not shown) for operating an electronic commerce Web site.

User database 46 contains information on each user of the vendor's Web site, including the user's name or other identifying information, account number, and any personal information on the user (i.e. credit card numbers, phone numbers, address, etc.) that the vendor requires. User database 46 also preferably includes information on the number of electronic tokens available to each user. User database 46 may also maintain data on how the user has spent tokens in the past, on whether the user is a "preferred customer," eligible to receive discounts on token purchases and other bonuses, the user's credit and payment status, and any other information that may assist the vendor to handle and track its customers.

Product database 47 contains details about products and services offered and their descriptions. These details preferably include at least a product name and a product price in tokens. Product database 47 may also include a variety of other information about products and services offered by the vendor, including descriptions and images of products, information on the manufacturers of products, additional information on services, information about the availability and stock on hand for products, and other information that would be useful for handling Web-based sales of products and services.

If the products being offered by the vendor include downloadable or rental software, product database 47 preferably contains information about the types of purchase or rental that are offered for each such software product. These types include:

a) permanent use;

b) rental use of a specified fixed time;

c) rental use for a specific number of times;

d) rental use for processing a specific number of a given task;

e) converting rental use from specific fixed time to an unlimited permanent use;

f) converting rental use from a specific number of times to an unlimited permanent use;

g) converting rental use from processing a specific number of a given task to an unlimited permanent use;

h) additional fixed time for an application software already rented;

i) additional number of times to use for an application software already rented; and j) additional processing of a specific number of a given task via an application software already rented.

Additionally, database server 43 handles user order and account number data 48, which maintains user order data with cross-referencing to the user account number while a client computer and server computer 20 interact. Database server 43 also handles product sold records 49, which keep track of products sold for future updating of products offered at the server. Both the user database 46 and product sold records 49 are updated when a business transaction is completed between a user client computer and server computer 20.

As will be understood by one skilled in the relevant arts, the software that is described hereinabove as executing on server computer 20 may be distributed among multiple server computers. Similarly, the databases and other records and data maintained by database server 43 may be distributed between multiple database servers executing on multiple server computers.

Figure 3:
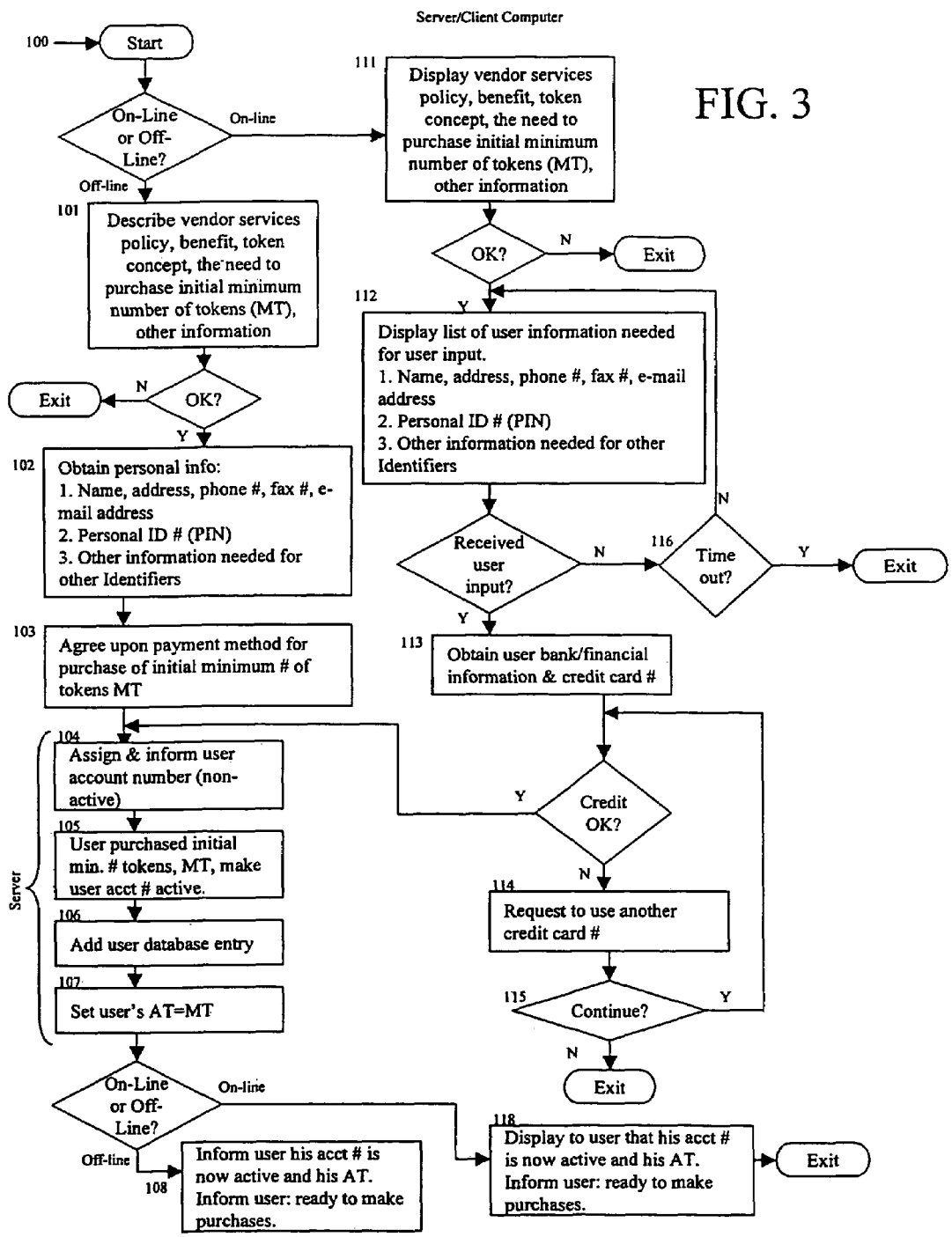
FIG. 3 is a flowchart of a method for establishing a user account.

Referring now to FIG. 3, The process for registering users with the system is described. In a preferred embodiment of the present invention, a user can register and establish an account over the network (on-line method) or using telephone, facsimile machine or mail (off-line method). It should be noted that as used herein, the use of e-mail between the user's personal computer (PC) and the vendor is considered an off-line method, since communications using e-mail is not a part of the business transaction between the user's client computer and the vendor's server computer.

The registration and establishment of an account with the vendor, either using the on-line method or off-line method requires a user to provide the vendor with personal information, such as name, address, telephone number, facsimile machine number, e-mail address, etc. To properly and securely identify a user, the vendor may require additional private information from the user, that may include the maiden name of the user's mother, the user's social security number, the user's birth date, and a password for use as a Personal Identification Number (PIN). As used herein, this personal private information is collectively called "other identifiers". These other identifiers are used from time to time to assure proper identification of the user. The user may change his PIN at any time if he so desires.

After the user provides the vendor the above information, a user is considered "Registered" and he is assigned an account number. This user account number, however, may be held inactive until the user completes the purchase of an initial minimum number of tokens (MT), as required by the vendor. Alternatively, the vendor may issue a number of tokens to the user when the user opens an account, either for payment of a registration fee, or for free, as an incentive for registration. When this is done, the user's account number becomes active immediately.

Steps 101 through 103 show the process for off-line registration. In step 101 the vendor provides a potential user information about the vendor or application service provider (ASP) which may include the type of products it offers to sell and/or rent, the concept of using tokens, how tokens can be purchased, and the requirement for the user to purchase an initial minimum number of tokens (MT).

If the user wants to proceed, at step 102, he is asked to provide personal information, which normally includes the user's name, address, telephone number, facsimile number, if any, and e-mail address. He also is asked for additional personal information (i.e., other identifiers), which may include a personal identification number (PIN) which will be changeable at the user's request. The other identifiers may also include the user's birth date, his social security number, and his mother's maiden name. This additional personal information (i.e., other identifiers) will be used, if necessary, to ensure correct identification of the user.

In step 103, the user is asked by the vendor how he wishes to pay for the initial minimum number of tokens (MT) required by the vendor. The vendor may, at his option, based on information given to him by the user, accept payment by the user's personal check, via the user's credit card, via a purchase order, or through any other payment method that the vendor is willing to accept from the user.

Once the user and vendor have agreed upon a payment method, the vendor inputs the user's information into server computer 20. At step 104, Server computer 20 assigns a user account number, which will be inactive until the user actually purchases or otherwise acquires the minimum number of tokens.

Next, the vendor informs the user of the account number and that this account will become active only after the purchase or acquisition of the initial minimum number of tokens (MT). When the user's payment for MT is confirmed, or the user otherwise acquires the minimum number of tokens, the server will make the user's account number "Active", create an entry and an account for the user in user database 46, set the user's available number of tokens (AT) to the minimum number of tokens, or the number of tokens acquired by the user, if the number is larger than the minimum (steps 105, 106, 107). Next, at step 108, the vendor informs the user that his account number is now active and that he is ready to make purchases.

If the on-line method is used, steps similar to those taken in the off-line method are taken, as indicated in steps 111, 112, 113, 104, 105, 106, 107, and 118. In the on-line method, communications between the vendor and the user occur over the network, using Web pages, for example. Additionally, when using the on-line method for payment, the user may be restricted to using a credit card to purchase the minimum number of tokens. If the credit card number given by the user is not accepted by a banking system accessed over the network by server computer 20, server computer 20 will ask the user to provide a different credit card number, as shown in step 114.

To avoid prolonging interaction between a client computer and server computer 20, after several unsuccessful attempts to process a valid credit card transaction, server computer 20 may inform the user and terminate the connection between the user's computer and server computer 20, as indicated in step 115. Similarly, if the user does not complete the requested personal information as indicated in step 112, a time limit is set, after which server computer 20 will inform the user that the connection with his client computer will be terminated, as shown in step 116.

Figure 4:
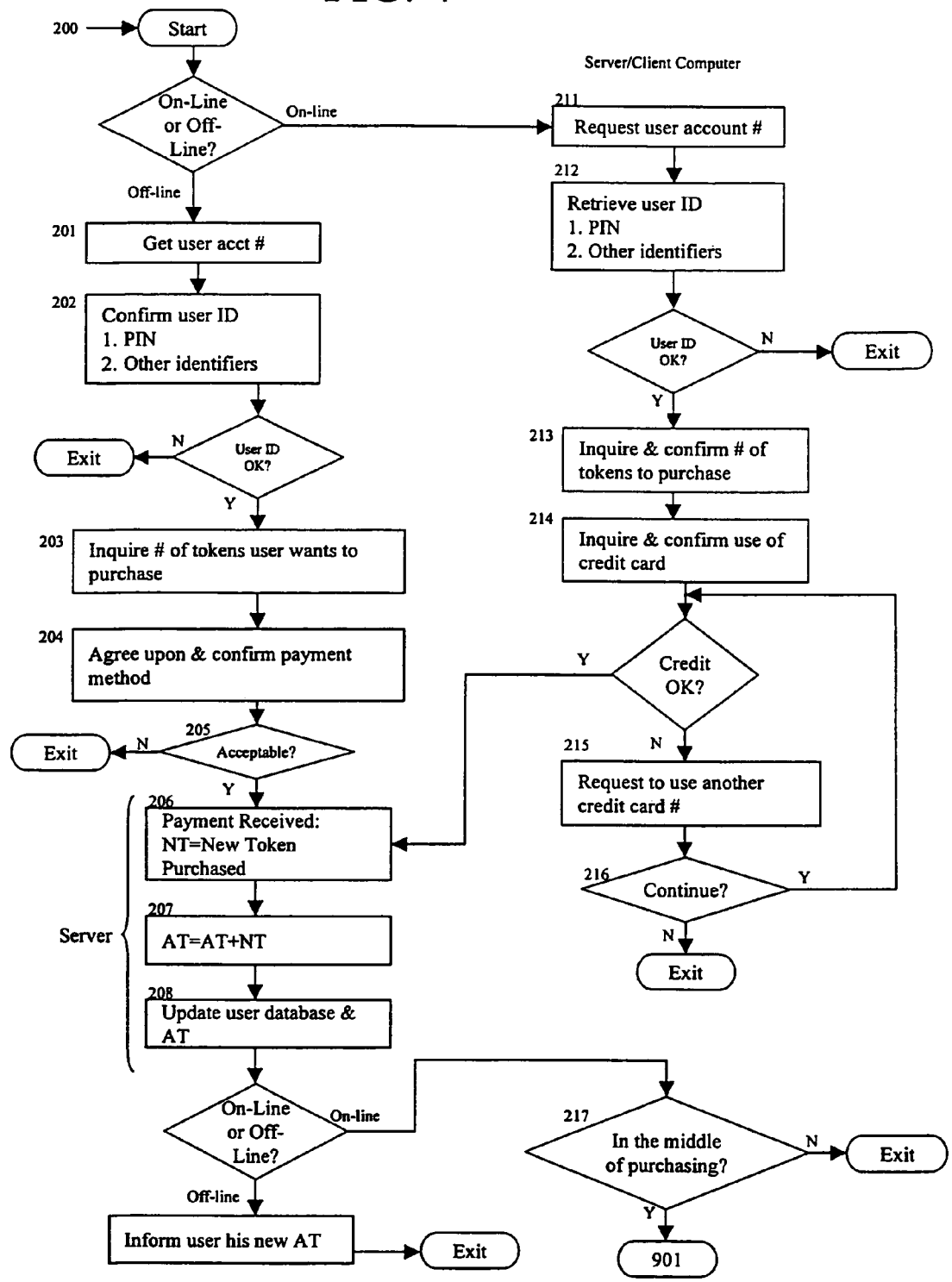
FIG. 4 is a flowchart of a method the permits users to purchase additional electronic tokens, either on-line or off-line.

Referring now to FIG. 4, a method for purchasing additional tokens from the vendor is described. In a preferred embodiment of the present invention, a user may purchase tokens using an on-line method or an off-line method. The minimum number of tokens a user is required to purchase (MT) and the price for each token may vary among vendors. Particularly, variations may exist among vendors in foreign countries and depending on the type or category of products they wish to sell and market on their particular Web site. Additionally, vendors may offer discounted prices for electronic tokens to "preferred" customers, or based on the volume of tokens purchased. In accordance with the present invention, since each vendor issues electronic tokens to be used to purchase its products and services, each vendor may set its own prices and policies for electronic tokens.

When using the off-line method for purchasing electronic tokens, the user may contact the vendor using the telephone, facsimile machine, regular mail or e-mail, and identify himself by giving the vendor his name and account number (step 201). In step 202, the operator further confirms the user's identity by asking for the user's PIN and perhaps other information confirming the user's identity.

At step 203, the user tells the vendor the number of additional tokens he wishes to purchase, and at step 204, the payment method for this new purchase is agreed upon between the user and the vendor. This may include payment by check, purchase order, by the user's credit card, or any other form of payment that the vendor is willing to accept from the user. Once the user's payment method is accepted or payment is received, the vendor will update the user's account in user database 46, and update the number of available tokens (AT) in the user's account (steps 206, 207 and 208). As shown in step 207, the newly purchased tokens (NT) are added to the user's available tokens (AT).

If the user elects to purchase additional tokens using the on-line method, steps similar to those using the off-line method are taken, as indicated in steps 211, 212, 213 and 214. As in the registration process, the communication between the vendor and the user is handled over the network, for example, using Web pages. Additionally, the user's payment options may be limited to using a credit card or other payment method that can be handled over a network such as the Internet. As with the purchase of the initial minimum number of tokens, an attempt to obtain a valid user credit card number will be made by server computer 20, as illustrated in steps 215 and 216.

It should be noted that the user may purchase additional tokens even while he is shopping. For example, if the user is shopping on the vendor's Web site, and discovers that his available tokens are insufficient to cover the total cost of products and services he wishes to purchase, he may elect to purchase additional tokens. In step 217, the server recognizes such situations, and returns control back to the user at his client computer after the tokens have been purchased. The server will display the last Web page viewed by the user when he switched to purchase additional tokens.

Figure 5:
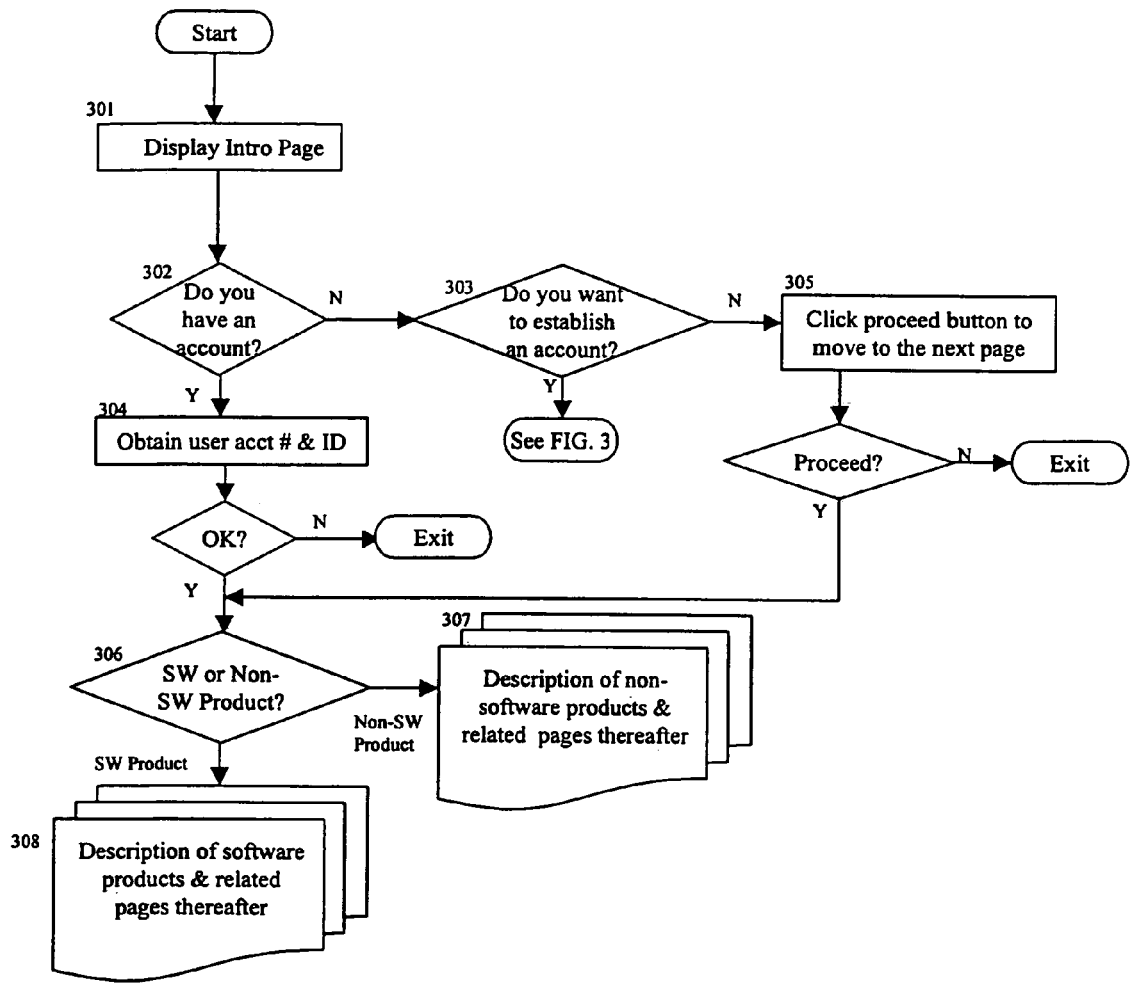
FIG. 5 is a flowchart showing a method for verifying that a user has an account, and for initiating a shopping session.

Referring now to FIG. 5, a method for initiating shopping over the network is described. A user may interact across a network, such as the Internet, with a vendor's server computer 20 using his client computer. Server computer 20 will ask the user whether he has an account with the vendor. If not, the user will be provided information on registration, and may be given an opportunity to open an account with the vendor. At the user's option, he may browse the vendor's Web pages and view various products and services offered by the vendor. If the user already has an account number, the server will verify the user's identity with a password, PIN, by use of other identifiers provided by the user, or by some combination of these.

It should be noted that a user with an inactive account number may browse the vendor's Web pages to view its services and various products being offered, just as may an unregistered user. However, the user may not be permitted to go beyond selected Web pages where cost information is listed and will not be permitted to create an order list and make an order for purchases or rentals. These restrictions are immediately removed when the user acquires the minimum number of tokens, and his account number becomes active. The minimum number of tokens the user purchased becomes his available tokens within the particular vendor Web page from which he purchased the tokens, only for use with that vendor.

In step 301, server computer 20 sends an introductory page for display to a client computer, which displays the introductory page to a user. This page preferably contains a message informing the user of the types of products and services available from the vendor, and that the vendor uses electronic tokens for payment. The introductory page also preferably contains a proceed button, that the user may select if he wishes to proceed, and enter the vendor's Web site, and a quit button, that the user may select if he does not wish to enter. The introductory page may also contain a home button, a back button, a forward button, and a last button, to facilitate rapid navigation through the vendor's Web pages.

It will be understood by one skilled in the relevant arts that display of an introductory page is optional, and some vendors may choose not to use such a page. Additionally, the message displayed in the introductory page will vary, according to the wishes of the vendor. Further, the above-described buttons may optionally be omitted, greyed out if not available, renamed, or displayed in any usable positions on the introductory page. One skilled in the art will further recognize that the introductory page may contain various types of content, including text displayed in a variety of fonts or styles, graphics, animations, sounds, video, or any other content that may be sent across the network from server computer 20 for display on a user's client computer.

If the user chooses to proceed, at step 302 server computer 20 asks the user if he has an account with the vendor. If the user does not have an account, he will be asked in step 303 whether he would like to register and establish an account with the vendor. If the answer is yes, he will be directed to the process of registration (either on-line or off-line), as described hereinabove with reference to FIG. 3. If the user is not ready to register, but wishes to continue browsing the Vendor's site, at step 305 he will be given an opportunity to proceed into the site, but without the ability to complete any purchases without first registering.

If the user already has an account, at step 304, he enters his account ID, preferably a user name or account number, and may be prompted by server computer 20 for further identifying information, such as a password, PIN, or other personal information. If the user correctly identifies himself to the vendor's system, the user may proceed with shopping. Otherwise, the user will be disconnected from server computer 20.

At step 306, the system determines whether the user is interested in purchasing or renting software or non-software products. This determination may be made by asking the user whether he is interested in software products and services or other products. Alternatively, this determination may be automatically made, for example, for vendors who do not sell software, or who only sell or rent software for download.

If the vendor is an application service provider (ASP), who rents or sells software for download, and the user wishes to view the software products being offered, then at step 308, the system displays descriptions of the software products that are available, and the types of purchase and rental that are available for each software product. If the user does not wish to view software products, or the vendor is not an ASP, then at step 307, the system causes the user's computer to display information on non-software products and services.

The information displayed by the vendor or ASP includes the price of each product or service, expressed as a number of electronic tokens. The user's available tokens also is displayed, if the user has an active account number.

Using the displays sent to his client computer by server computer 20, a user may select a subset of the products and services offered, and place the selected products on his order list. As the user adds and removes items from his order list, the total number of tokens required to pay for the selected products and services (RT) is constantly updated and displayed at the user's client computer. In this way, the user is constantly informed whether his available tokens, which is also displayed, will be enough to cover the total cost of his purchases.

If the user's number of available tokens is equal or larger than the number of tokens required for the products and services on the user's order list, the user can simply click an order button on the display to purchase or rent the items on the order list. Server computer 20 will send a confirmation of the user's orders, including information regarding downloading of software products, the total cost of products in numbers of tokens, and the number of tokens that the user has remaining in his account after the purchase.

When the user is satisfied with the order, he can click on an order confirmed button to complete the transaction. When an order is confirmed, server computer 20 will subtract the number of tokens required for the purchase from the user's account, and cause the user's client computer to display an acknowledgment of the purchases. If the user's order list included software, server 20 may start downloading the purchased or rented software products if they are not already installed on the user's computer. If the user has purchased an extension of a rental period on a software product, or the purchased or rented software product is already installed on the user's computer, then server computer 20 will send a new authorization code for the software.

It will be understood by one skilled in the art that the method and system being described in the present invention for using vendor-issued tokens in a networked environment may be applied to both software and non-software products and services. However, the example preferred embodiment described herein will be described in terms of an ASP, that provides software products for sale or rental. The sale or rental of non-software products is similar to the sale or rental of software products, but is somewhat simpler, since there are fewer types of sale or rental of non-software products and services, and sale or rental of non-software products does not involve use of authorization codes. The methods for sale or rental of non-software products and services may be considered a subset of the methods used for sale or rental of software, as described hereinbelow.

Figure 6:
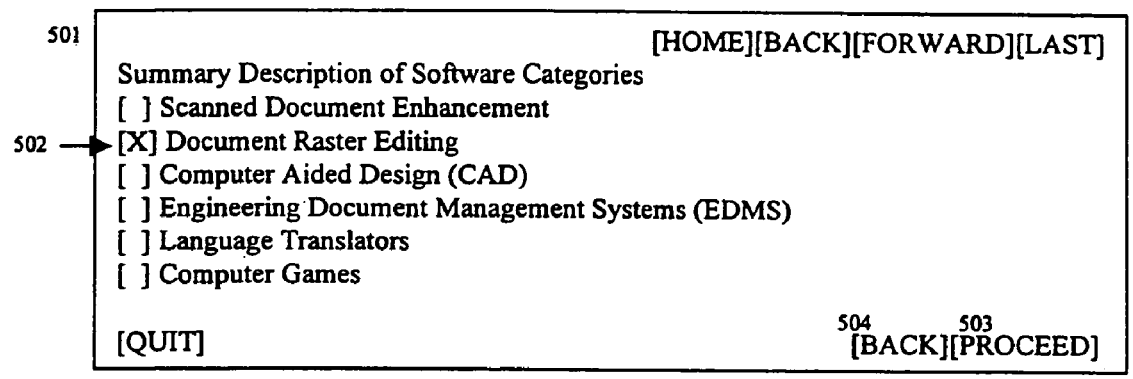
FIG. 6 is an example screen from an application service provider, showing categories of software available for sale or rental.

Referring now to FIG. 6, a screen showing example available categories of software for sale or rental is shown. The example shows software category display 501 for an ASP that offers software products in the field of Scanned Document Enhancement, Document Raster Editing, Computer Aided Design, Engineering Document Management Systems, Language Translators and Computer Games. A user may select one of the categories by clicking the desired category. In this example, the user has selected the Document Raster Editing category as shown with a check mark in corresponding box 502. The user can de-select the selected category by clicking again in the check-marked box. The user can go back to the previous display by clicking on back button 504, or proceed to the next display by clicking on proceed button 503.

In an example shown in FIG. 7, software availability page 601 displays software products A, B, C, and D listed under the selected software category from software category display 501 of FIG. 6. As shown by category headings 602, each software product may be available for purchase, rent by time, rent by number of uses, or rent by number of processings.

Corresponding to each software product and each category heading 602, there is an availability box 603. If an availability box 603 contains a check mark, then the corresponding software product is available in the corresponding category heading. Thus, in the example shown in FIG. 6, software product B is available for purchase or rental by time, software product C is available for purchase or rental by number of times of use, and software product D is available only for rental by number of processing tasks. The user may select the software products and categories of rental or purchase he desires by clicking on the corresponding availability box 603, if that availability box 603 contains a check mark.

Similar to the example shown in FIG. 6, back button 605 allows the user to go back to the previous display or step, and proceed button 604 will allow the user to go to the next step. At the option of the vendor or ASP, use of proceed button 604 may cause the display of a message informing an unregistered user that he must register before he may proceed further. The user may then register with the vendor, following the method described with reference to FIG. 3.

FIG. 8 shows an example of order list display 700, in which the user has specified a subset of the products offered by the ASP as order list 701. With each of the software products in order list 701 the number of tokens required for purchase or rental is shown. In the example, software product A costs 100 tokens, and software product D is available only for rent, with a price in tokens that varies according to the number of processings that the user desires to access. In the example, the user has selected up to 1000 processings, at a cost of 80 tokens.

For the user's convenience, order list display 700 includes RT display 705, showing the total number of tokens required for the purchase, AT display 706, showing the total number of tokens available to the user, and remaining tokens display 707, showing the number of tokens that the user will have left if the purchase is made. Each of these displays automatically updates as the user adds and removes items from his order list.

If the user wants to know more detail about the software in order list 701, he can select a detail button 703 that corresponds to the product about which he would like further information. Additionally, since software product D is being rented, installation query 704 is used to ask the user whether software product D is already installed on his computer. If software product D is not already installed, then server computer 20 must download software product D to the user's computer, along with an appropriate authorization code. Otherwise, if software product D is already installed, then server computer 20 need only send a new authorization code for the rental of software product D to be extended, saving download time and bandwidth.

Although user database 46 on server computer 20 may maintain information on whether the user has downloaded a selected software product in the past, it is still desirable to confirm with the user that the selected software product is installed, since the user may have removed the software product from his computer, or may be accessing the ASP's Web site from a different client computer. Alternatively server computer 20 may automatically check for the presence of a selected software product on the user's client computer by causing the client computer to execute an applet or other code to check for the presence of the selected software product.

Order list 701 may be modified by the user by clicking on the selection box next to the product to be added or removed. If an empty selection box is clicked, a check mark will appear in the box, indicating that the product has been selected. If a selection box containing a check mark is clicked, the check mark will be removed, and the product will be deselected. As products are selected and deselected in order list 701, RT display 705, AT display 706, and remaining tokens display 707 are automatically updated to reflect the number of tokens required for the purchase, the number of tokens available to the user, and the number of tokens that would remain in the user's account if the purchase were completed. Once the user is satisfied with the contents of order list 701, his order may be entered by selecting order button 708.

As in other displays, back button 709 will return the user to a previous display if selected. Quit button 710 will immediately end the user's connection with the ASP's Web site, without completing the transaction.

FIG. 9 shows an example of order display 800. In this display, server computer 20 shows the details of the user's order in response to the user's clicking order button 708. Final RT display 801 shows the total number of tokens required for the purchase. User AT display 802 shows the number of tokens that the user has available at the time of purchase. New AT display 803 shows the number of tokens that the user will have available in his account after the purchase has been completed. In the example shown in FIG. 9, the purchase will require 180 tokens out of the user's 500 available tokens, leaving the user with 320 tokens after the purchase is completed.

If the user wishes to complete the order, he can click on order confirmed button 804, indicating that the order is acceptable. When order confirmed button 804 is clicked, server computer 20 will cause a message thanking the user for his purchase (not shown), and may start downloading any software products that need to be downloaded to the user's computer. This completes the business transaction and the user may click quit button 806 on the display to disconnect his client computer from server computer 20. If the user wants to change his order before confirming it, he can click on back button 805, to return to the previous display.

It will be understood by one skilled in the art that the example displays shown in FIGS. 6, 7, 8, and 9 may be modified in many ways without departing from the invention. The layout of the elements on the page, the wording of the text, and even the presence or absence of many of the elements shown in these displays may be altered. For instance, for a non-ASP vendor, which does not offer software for download, installation query 704 of FIG. 8 would not be needed, and would not be displayed. Many other such modifications to the display layout and user interface may also be made, depending on the needs and desires of the vendor or ASP.

Figure 10:
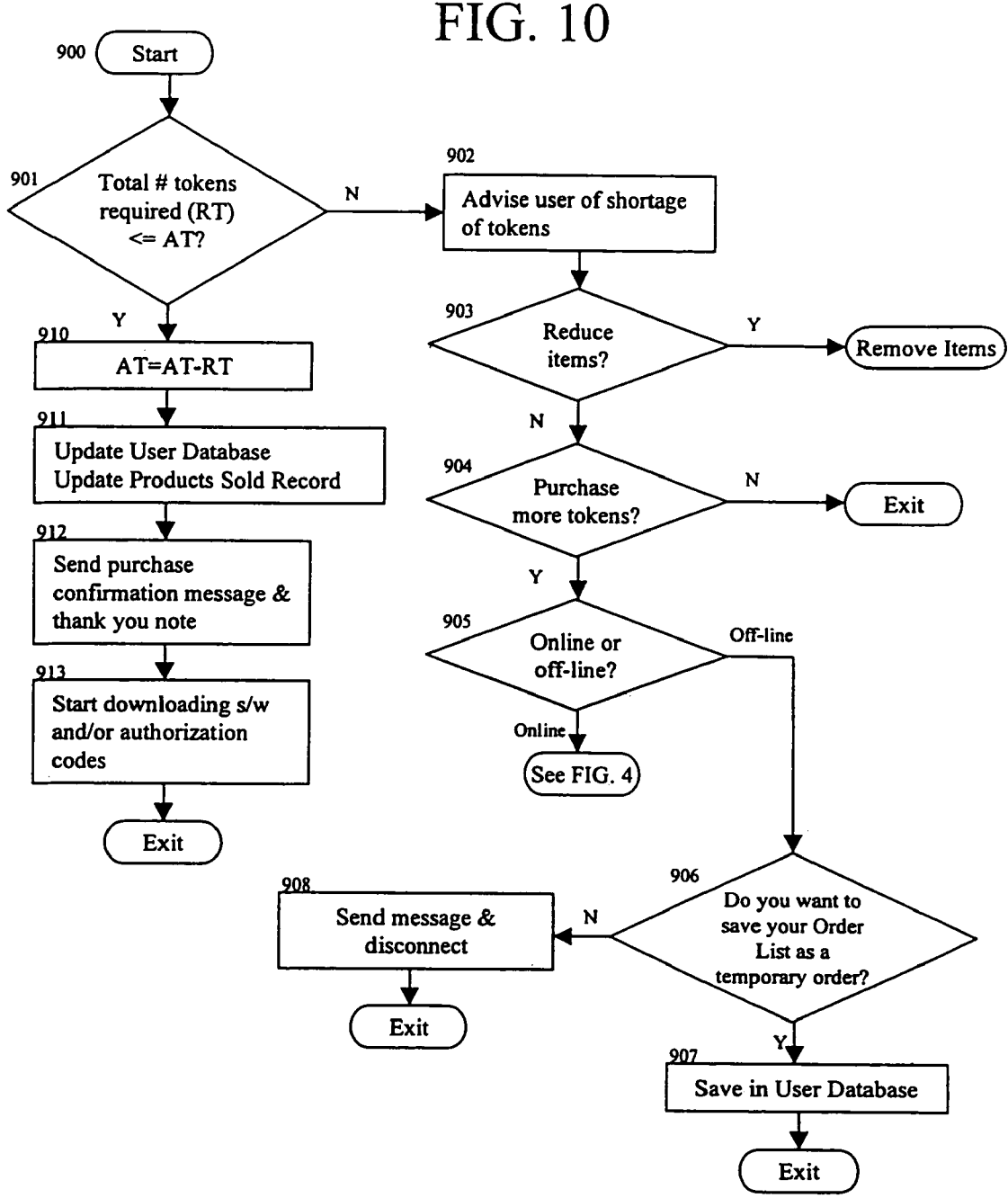
FIG. 10 is a flowchart showing a method for verifying that a user has enough tokens to complete a purchase.

Referring now to FIG. 10, a method for handling purchases is described. When a user places an order, as described hereinabove, the user's available tokens must be updated. In some cases, a user may attempt to place an order even though he does not have enough tokens available in his account to cover the order. If the number of tokens required for a purchase is larger than the number of tokens available in a user's account, the server will advise the user to either remove items from his order list to reduce the number of tokens required, or to purchase additional tokens. The additional tokens can be purchased immediately using the on-line method or the user may purchase additional tokens using the off-line method.

In step 901, the system checks the total number of tokens required for a purchase (RT) against the number of tokens available to the user (AT). If the user has too few tokens to cover the purchase, at step 902, the user is advised of the shortage of tokens. The user is then given the options of removing items from his order list (step 903) or purchasing more tokens (step 904).

If the user chooses to remove items from his order list to reduce the required number of tokens, he may return to an order list display, such as the one shown in FIG. 8. If the user decides to purchase more tokens from the vendor or ASP, he must decide whether to use the on-line purchase method or the off-line purchase method (step 905).

For the on-line method, the user may use a credit card, as described hereinabove with reference to FIG. 4. If the off-line method is chosen, it may not be possible for the vendor or ASP to immediately issue additional tokens to the user, since, for example, the vendor may have to wait for a check from the user to arrive in the mail and be processed by the user's bank. So the user does not have to go to the effort of rebuilding his order list when he has acquired enough tokens, he will be asked to if he wants to save his order list (step 906). If the user wishes to save his order list, server computer 20 will save the order list in user database 46 as a temporary, uncompleted order list, in step 907. In step 908, if the user does not wish to save the order list, the server will send an appropriate message and disconnect the client computer.

If the number of tokens required for the purchase is less than or equal to the number of available tokens, and the user clicks on order confirmed button 804. Then, at step 910, server computer 20 updates the number of tokens available in the user's account. This is done by subtracting the number of tokens required for the purchase (RT) from the number of available tokens (AT), and saving the new number of available tokens. Server computer 20 then updates the user database 46, and product sold records 49 (step 911), and sends a purchase confirmation message and thank you note to the user (step 912).

Finally, at step 913, if the user has purchased or rented any downloadable software, server computer 20 downloads any software or authorization codes that must be downloaded to the user's computer. As explained above, this may include a step (not shown) of determining whether the software has already been installed on the user's computer. If the needed software is already installed, then only an authorization code need be downloaded. It will be understood by one skilled in the art that for vendors who do not offer downloadable software (i.e. the vendor is not an ASP), step 913 is unnecessary.

Figure 11:
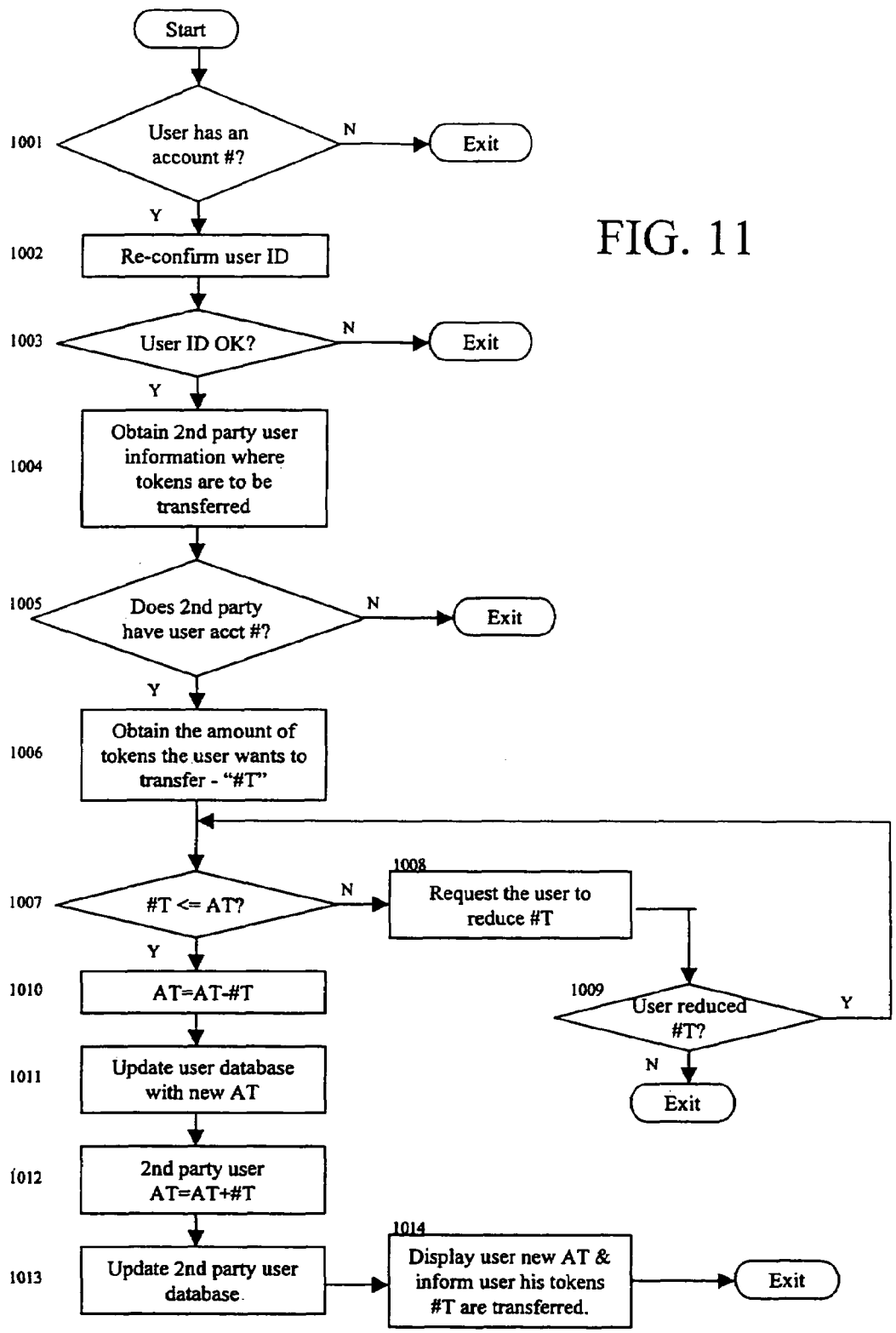
FIG. 11 is a flowchart of a method for transferring electronic tokens from one user to another.

Referring now to FIG. 11, a method of transferring electronic tokens from the account of one user to another user's account is described. Such transfers provide a way for users to exchange electronic tokens issued by a vendor. This may be useful, for example, for conducting on-line auctions, in which one user of an auction Web site bids on products or services offered by another user of the auction site. Instead of sending money to the seller to pay for goods, the buyer transfers electronic tokens issued by the auction site to the seller. Transfer of tokens also may be useful on sites where the vendor does not allow tokens to be converted back to real money, as a way of giving unused tokens to those who may be able to use them.

At step 1001, server computer 20 will ask the user his account number. Next, at steps 1002 and 1003, server computer 20 will request other personal information, such as a PIN number from the user, to further verify the user's identity.

Having verified the identity of the user from whom the tokens are being transferred, at step 1004, the system next obtains the identity of the second party to whom the tokens are being transferred. In a preferred embodiment, the identifying information on the second party includes several fields, such as a name and address, that can be cross-checked, to confirm that there has not been an error in entering the information on the second party. To further confirm that there is no error, the user conducting the transfer may be asked whether he knows the second party's user account number. If this is not known, the server will obtain the account number from user database 46, and check to see if the second party is registered and has an account number with the server. If the server failed to find the second party's record with a valid account number, it will so advise the user and terminate the connection, as shown in step 1005.

If the second party has an account number, at step 1006, server computer 20 will ask the user the number of tokens he wants to transfer. In step 1007, server computer 20 will verify that the user has enough tokens available to allow the user to make the requested transfer. If not, in step 1008, the server will request that the user reduce the number of tokens to be transferred, advising him that the number of tokens available to him is insufficient. If the user does not wish to reduce the number of tokens being transferred, at step 1009, the transfer operation will end without completing the transfer of tokens. Alternatively, the vendor may offer to sell the user additional tokens, so that the transfer may be completed.

If the number of tokens being transferred is less than or equal to the number of tokens available in the user's account, then at step 1010 and 1011, server computer 20 subtracts the number of tokens being transferred from the user's account, and updates user database 46 with the new number of tokens, and a record of the transaction. At steps 1012 and 1013, the transferred tokens are added to the account of the second party (i.e. the recipient), and user database 46 is updated to record the transfer of the tokens. Finally, at step 1014, server computer 20 displays the user's new number of available tokens, and informs the user that the designated number of tokens have been transferred to the second party.

In accordance with the principles of the present invention, since the vendor controls all aspects of token use on the vendor's site, tokens may only be transferred between users with accounts maintained by that vendor. Thus, tokens issued by one vendor may not be transferred to an account maintained on a different vendor's system. Similarly, tokens purchased from one vendor cannot be used to purchase products or services at a different vendor's site.

Figure 12:
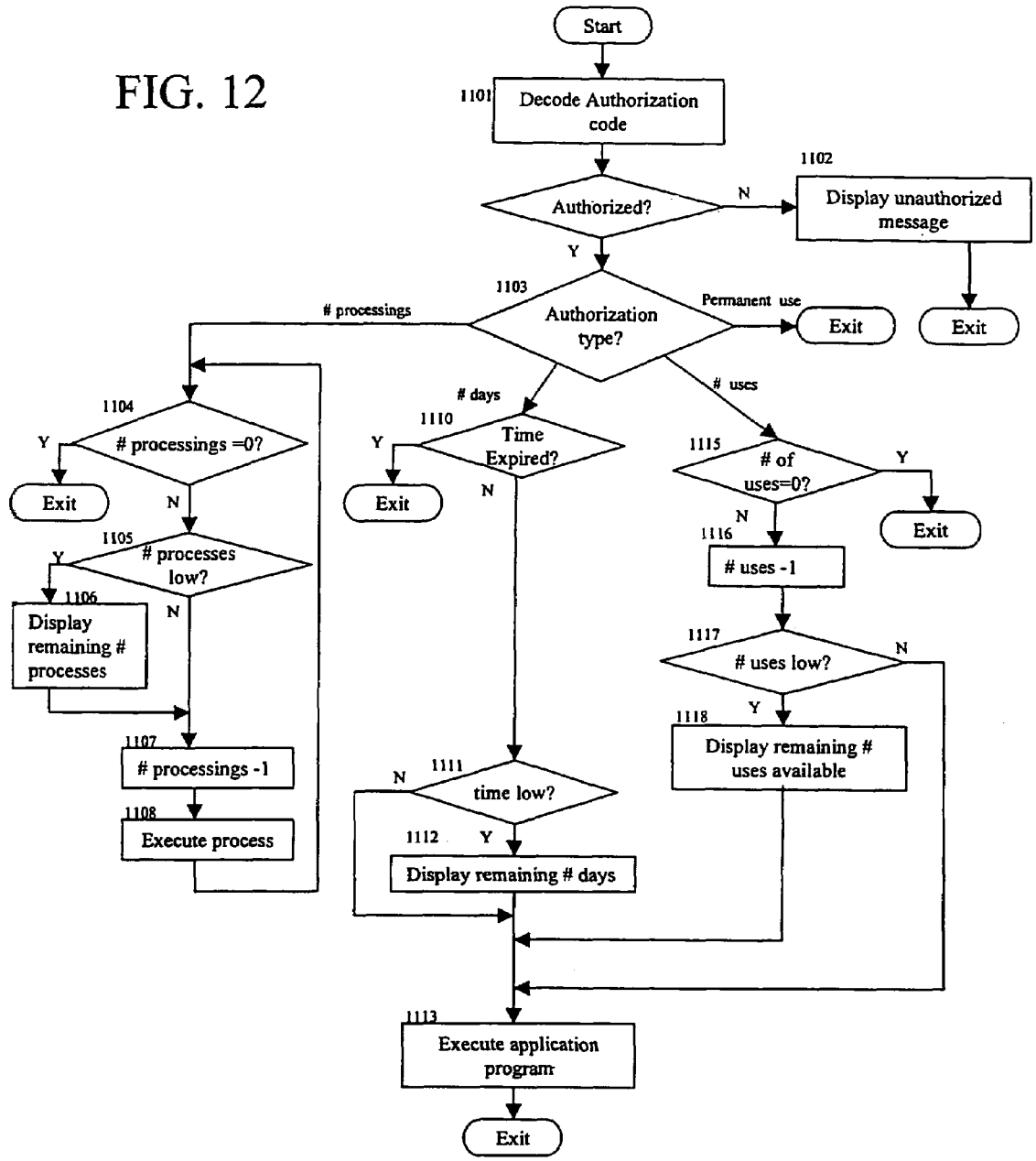
FIG. 12 is a flowchart of a method for verifying that use of rental software is authorized.

Referring now to FIG. 12, a flow chart illustrating a method of verifying authorization codes for use with rental software is shown. As explained hereinabove, through use of electronic tokens, users are able to make micropayments and conduct other low-overhead transactions that make rental of software products for a limited number of uses or a limited number of processings practical. Application service providers (ASPs) may offer access to a variety of downloadable software for purchase or rental. To insure that users do not exceed their allotted rental period, an authorization code is sent to the rental software that allows it to determine whether its use is authorized.

At step 1101, the software decodes the authorization code. Typically, authorization codes will be encrypted or otherwise encoded with information such as a time stamp or authorization code number that prevents a user from altering or duplicating an authorization code. Thus, to use an authorization code, the code should first be decrypted or decoded.

At step 1102, if the decoding of the authorization code failed, and use of the software product is not authorized, the software will display a message to the user advising him that the software is not authorized, and exit. Additionally, the software may automatically invoke a Web browser or other network tool to connect the user to an ASP who can sell the user a new authorization code for the software, in exchange for electronic tokens.

At step 1103, if the authorization code was valid, the software determines the type of the authorization code. If the authorization code authorizes permanent use of the software product, the verification process is over, and the software may execute. Otherwise, the authorization software must determine whether there is any time, uses, or processings left on the authorization code, depending on the type of authorization code.

If the authorization code is of a type that permits a number of processings, the software checks to see if the number of processings is zero (step 1104), or low (step 1105). If there are no processings left, the software displays a message, and exits. If the number of processings remaining is low, the software displays a message warning the user that the number of processings is low (step 1106), and continues. In either of these cases, the user may be automatically connected with an ASP, and be given the opportunity to use electronic tokens to purchase additional processings.

If the authorization code indicates that there are still processings remaining, at step 1107, the software subtracts one from the number of processings, and at step 1108, the process is executed. Once the process is finished, it may be repeated until no processings remain.

If the authorization code is of a type that permits a number of days of use, or another time-based rental, the software checks to see if there is any time remaining (step 1110), or if the remaining time is short (step 1111). If the time period of the rental has expired, the software displays a message, and exits. If the remaining time is short, the software displays a message warning the user that the amount of time remaining is low (step 1112), and continues. In either of these cases, the user may be automatically connected with an ASP, and be given the opportunity to use electronic tokens to purchase additional time on the rental. If the authorization code indicates that there is still time remaining, at step 1113, the application program is executed.

If the authorization code is of a type that permits a fixed number of uses of the application program, the software checks to see if there are any uses remaining (step 1115). If so, one use is subtracted from the remaining uses (step 1116), and the software checks to see if the remaining number of uses is low (step 1117). If the remaining number of uses is low, the software displays a message warning the user that the number of uses remaining is low (step 1118), and continues. In either of these cases, the user may be automatically connected with an ASP, and be given the opportunity to use electronic tokens to purchase additional uses of the rental software. Finally, at step 1113, if there was at least one remaining use of the software, the application program is executed.

It will be understood by one skilled in the art that there may be other terms for which software may be rented, and that the above-described authorization method could be easily modified to handle other types of software rental. The ability to use electronic tokens to reduce the overhead of software rental transactions, and the use of authorization codes to verify the legitimate use of rented software and to avoid unnecessary downloads facilitate a variety of software rental models.

Figure 13:
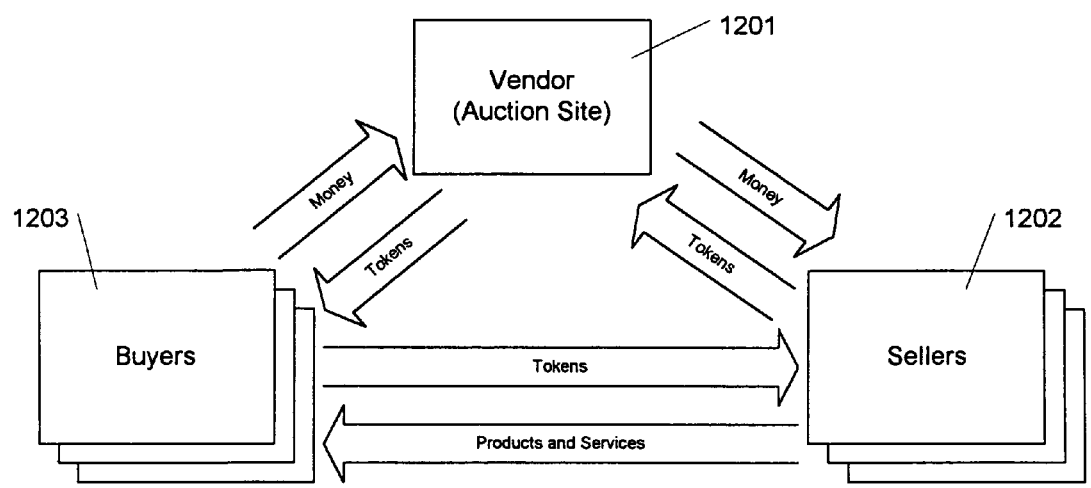
FIG. 13 shows an embodiment of the present invention for use on an auction site, in which electronic tokens are used for payment.

Referring to FIG. 13, an alternative embodiment of the electronic token system of the present invention for use on an auction site or other site that facilitates transactions between users of the site is shown. Vendor 1201, instead of directly selling products and services, as in previously described preferred embodiments, acts as an intermediary through which users can sell products and services to each other. Additionally, vendor 1201 buys and sells electronic tokens that may be used by the users to transact business. By using electronic tokens as payment between users for products and services, the users are able to quickly and easily pay each other for products and services, without having to obtain and send a money order, as is typically required by sellers on current auction sites.

Vendor 1201 provides both on-line and off-line sale of electronic tokens, as described in detail hereinabove. Additionally, vendor 1201 may permit electronic tokens to be redeemed for money, either on-line, through issuing a credit on a credit card, or off-line, by issuing and mailing a check for redeemed tokens.

Sellers 1202 are users of the Web site or other e-commerce venue offered by vendor 1201. Through vendor 1201, who may receive a commission, fee or other payment, sellers 1202 offer products and services for sale or auction, with prices or minimum bids listed in tokens.

Buyers 1203 use the Web site provided by vendor 1201 to purchase electronic tokens from vendor 1201, and to purchase products and services from sellers. Buyers 1203 pay for products or services, or place bids for products and services using electronic tokens. Sellers 1202 may be paid for their products or services by transferring the appropriate number of electronic tokens between the accounts of buyers 1203 and sellers 1202.

Sellers 1202 may use the electronic tokens that they gain from selling their products and services to purchase products and services from other sellers. Alternatively, sellers 1202 may sell their tokens back to vendor 1201 for money.

This system offers numerous advantages over current auction sites and other venues for conducting e-commerce between individuals. First, the individual buyers 1203 and sellers 1202 are able to easily arrange payment, rather than requiring that checks or money orders be sent. Additionally, there is no need for buyers 1203 and sellers 1202 in different countries to be concerned about currency exchange, since all transactions are handled in electronic tokens, which may be bought and sold by vendor 1201 for any form of currency that vendor 1201 chooses to accept. Further, vendor 1201 can make his "commission" on sales on the system by buying electronic tokens back from sellers 1202 at a different price than they are sold to buyers 1203, thereby simplifying the task of collecting payment from sellers 1202.

It will be understood by one skilled in the art that the embodiment of the present invention described with reference to FIG. 13 may be used for more than just auctions between individual buyers and sellers. The buyers and sellers may be businesses or other corporations, and there is no need that the transactions be carried out in auction style. Similar methods may be used in which sellers 1202 simply list their products and services with vendor 1201, with prices in electronic tokens, and buyers 1203 buy the products and services from sellers 1202 through vendor 1201, using electronic tokens as the exclusive means of payment. As discussed above, only electronic tokens issued by the vendor may be transferred or used on that vendor's site.

While preferred illustrative embodiments of the present invention are described above, it will be evident to one skilled in the art that various changes and modifications may be made without departing from the invention. For example, electronic tokens may be given away in contests or as incentives, or different forms of on-line and off-line payment may be accepted at the option of vendors. It is intended in the appended claims to cover all such changes and modifications which fall within the true spirit and scope of the invention.

Because the vendor is the issuer of the electronic tokens, in formulating these prices, he may set the value of the token to any level that he chooses. Under the present invention the vendor has the total control of the distribution and to set the value of the tokens completely free from a bank or other organization to issue the tokens. The user purchases tokens directly from the vendor, in any way he chooses, either using on-line or off-line methods, without the need to involve a bank. Therefore, the methods and apparatus as invented is a "closed" system.

While the vendor lists the prices of the products and services offered on his web site in terms of electronic tokens, it is also desirable that the vendor also lists these prices in actual currency side by side with the corresponding number of tokens. This will help the user to associate the price between the electronic tokens and the actual currency, in case the vendor sets the price of each electronic token at a higher value than the smallest unit of the actual currency. Furthermore, the vendor may allow a user to purchase products and services offered on his web site, either using electronic tokens or a credit card. This provides the user a choice of method of payment prior to his getting familiar with strictly using electronic tokens.

A further embodiment of the present invention is now described. The question arises as to how a user who registered with a token mall web site is allowed to purchase products or services from other vendors who also use electronic tokens for his web site. Furthermore, each vendor has the complete freedom to set the value of the tokens at his web site, the value of tokens may vary from one vendor's web site to another vendor's web site.

The present invention provides a Vendor Mall (Web Site) Services Provider (MSP) which allows a user of a Vendor Web Site to purchase products and services from another vendor's web Site seamlessly without having to concern himself with different values of tokens. The MSP invented here also automatically sends the user's information from the vendor with whom he registered to another vendor's web site where he wants to have his electronic tokens transferred and to purchase items and services offered at another vendor's Web Site. This allows the other vendor to automatically register the user coming from the different Web Site. It therefore provides the convenience that a user is not required to register at each and every Web Site where he wishes to make purchases provided that they offer electronic tokens and honor tokens from another participating Web Site.

The MSP in the method and system of the present invention will also monitor transferring of tokens among member malls. For example, the MSP can prevent transferring of tokens issued from a mall whose performance is not meeting the standards of business practice established by the MSP in order to participate in the mall program. It can also shut down a mall for further on-line business using tokens. This preserves the integrity of use of token systems by vendors. Furthermore, the method and system, as invented, also keeps record of paid tokens, tokens to be paid (tokens issued to preferred customers in advance of payment) and free tokens issued as part of the vendor's incentive program, similar to frequent flyer programs. This is important because the vendor may decide to issue free tokens to a user who has already purchased tokens (not tokens to be paid) in his account but has not used them for awhile. This will give the user the perception as if he is receiving an interest payment like depositing his money in a bank.

The method and system keeps the record of free tokens issued to a user hoping that the user will use free tokens he received to purchase more products and services from the vendor, not to transfer these free tokens to other vendor malls, thus retaining customer loyalty. The method and system as invented provides a means to prevent transferring of free tokens to other vendor malls.

Furthermore, the MSP will display all malls with whom the user has an account together with available tokens and free tokens in each respective mall. This provides the user with the convenience to manage his accounts since he may have accounts with many malls and may need to know from which mall he wants to transfer tokens to a new vendor mall.

The MSP will perform the following tasks:

(1) Keep track of the value of tokens as set by each vendor for his Web Site.

(2) Keep track of each vendor who will accept other vendors' tokens and permit users of other vendors to purchase products or services from his Web Site.

(3) Send the user's information to another vendor, allowing the other vendor to register that user.

(4) Convert one vendor's tokens to other vendors' tokens, allowing a user of one vendor's Web Site to purchase products or services offered by the other vendor's Web Site.

(5) When a user of a vendor's Web Site A transfers his tokens to another vendor's Web Site B, through the MSP, the MSP computes the value of tokens transferred from Web Site A to Web Site B in order that Web Site A can pay Web Site B for the value of tokens so transferred.

(6) At an appropriate time, normally at the end of each month or at other regular intervals as mutually agreed upon, the MSP serves to clear accounts between member vendors under the MSP services.

(7) Monitor transfer of tokens between malls to prevent transfer of tokens issued by a mall whose business integrity or performance does not meet the high contractual standards established by the MSP.

(8) Prevent a mall to further use the tokens as the price for products and services by a vendor, if the vendor does not keep up with the highest quality in offering and delivering products and services or who otherwise does not comply with contractual obligations set by the MSP.

A similar situation exists when a vendor with many chain stores under franchise and each having his own Web Site, will want a user who is registered at one of the franchised store's Web Site to purchase products or services offered at the other franchised store's Web Site. Although one would expect that the value of tokens will be the same throughout the franchised chain stores, the parent vendor could have a program similar to the MSP that will allow a user registered at one of the franchised stores to purchase products and services offered by the other franchised store. These franchised stores could then clear accounts between themselves at a pre-determined frequency.

The present invention provides a method and system for conducting business transactions in a networked environment using electronic tokens as a price for each product or service being offered for sale or rental by a vendor. The present invention permits the vendor the complete freedom to set the value of each token. The user may purchase the vendor's tokens either on-line (e.g., using a credit card) or off-line (e.g., using a check, money order or purchase order) at any time. No bank or any third party intermediary is involved in the settlement of the business transactions between the vendor and the user. In this sense, the present invention represents a "closed" system.

It is desirable that a user registered with a vendor who uses tokens as a price for each product or service for sale or rental be able to purchase products or services offered by other vendors who also use tokens as a price for products or services offered for sale or rental, at their Web Site ("Malls"). This eliminates the requirement of having the user register at the other vendor's Malls to purchase their electronic tokens. The method and system as invented permits a user, registered at any vendor Mall, to purchase products or services from any other vendor Malls, as long as each Mall agrees to accept the other vendor Mall's tokens for later settlement between those Malls. The transfer of tokens between one vendor to the other and settlement of money associated with transferring of tokens between Malls are performed by the Mall Service Provider (MSP), as shown in FIG. 14, 1300.

Figure 14:
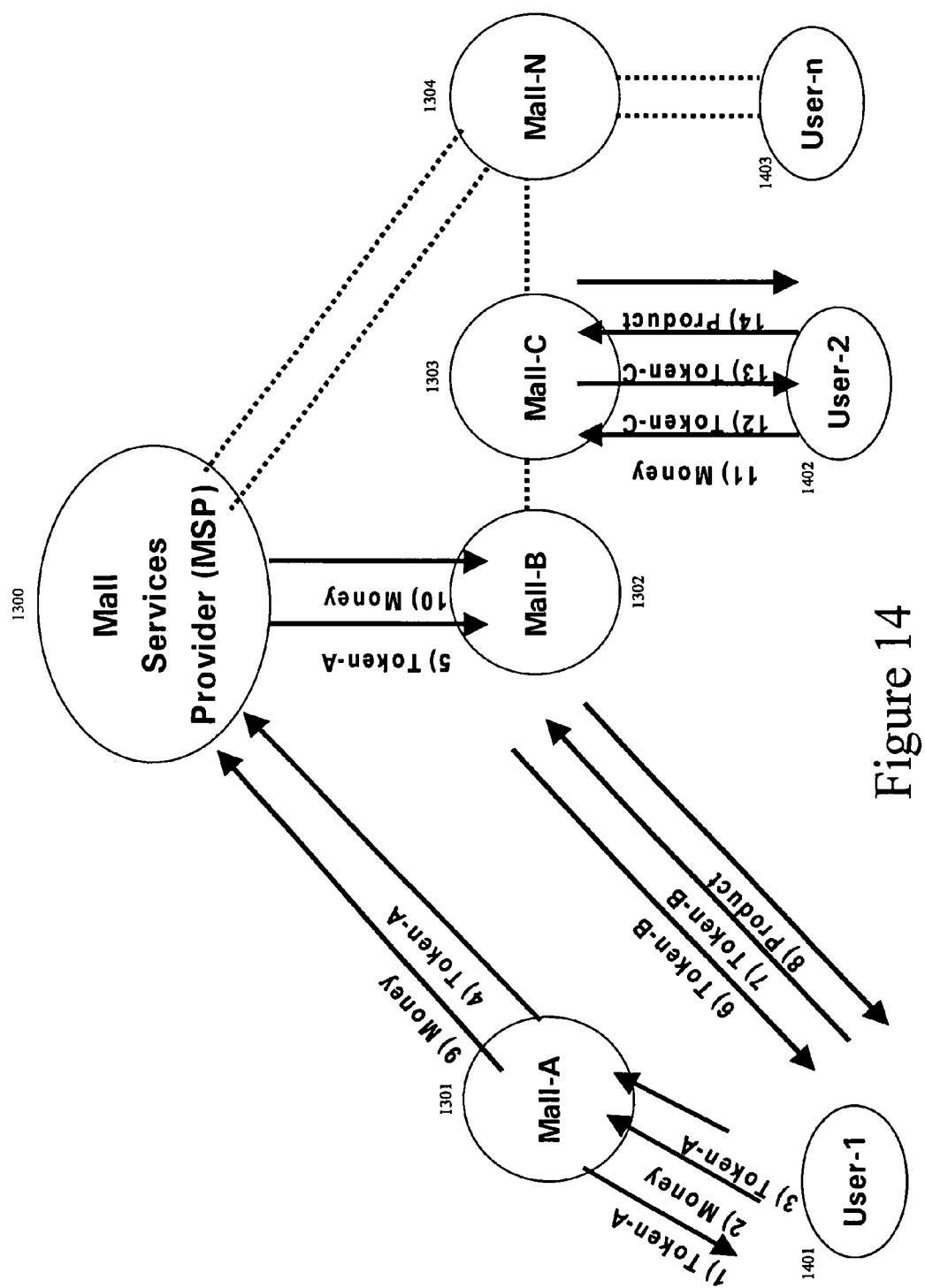
FIG. 14 is an overview of the process in which a user registered and purchased electronic tokens from a vendor, Mall-A, then purchases products or services offered at another vendor, Mall-B, by transferring electronic tokens of vendor, Mall-A, to electronic tokens of Mall-B, through the Mall Services Provider (MSP)

Referring to FIG. 14, each of the solid arrows indicates steps (1)-(14), which represent a transaction in the direction of the arrow. User 1, 1401 received a certain amount of Token-A issued by Mall A, 1301, as shown in Step (1). User 1 pays Mall A for the cost of Token-A he purchased, as shown in Step (2). Note that the operator of Mall A, 1301, may at his own discretion, provide a certain amount of Token-As to user 1, 1401, prior to receiving payment from user 1. Such is not the case where the operator of Mall C, 1303, chooses to have user 2, 1402, make the payment, Step (11), before he grants a certain amount of Token-Cs, Step (12), to user 2, 1402.

In FIG. 14, user 1, 1401, wants to purchase products offered by Mall B, 1302. He requests Mall A, 1301, to transfer a certain amount of his Token-As to Mall B, 1302, and to receive the equivalent value of Token-Bs from Mall B, 1302. Steps (3), (4), (5) and (6) show the process of token transfer from Mall A, 1301, through the MSP, 1300, to Mall B, 1302, for user 1, 1401. Steps (7) and (8) show that user 1, 1401, purchases products from Mall B, 1302, using Token-B.

Since Mall A, 1301, at the request of user 1, 1401, transferred a certain amount of Token-As purchased by user 1, to Mall B and since Mall B issued an equivalent value of Token-Bs to user 1 at Mall A's request, Mall B should receive payment for that amount of Token-Bs it issued to user 1 from Mall A. The settlement of the payment between Mall A and Mall B is performed by the MSP, 1300. This is shown in Steps (9) and (10).

Similarly, a user registered at Mall B, 1302, may purchase products and services offered at Mall A, 1301, by requesting Mall B, 1302, to transfer a certain amount of Token-Bs to Mall A, 1301, through the service of the MSP, 1300.

The present invention provides a method and system for a user registered at a vendor mall to purchase products or services at another "Member Mall," without requiring the user to register at another Member Mall. The term "Member Mall" referred to herein indicates any vendor mall who agrees to accept tokens of the other vendor mall and convert the other vendor mall's token to its own tokens of equivalent value to the user who registered at the other vendor mall. In FIG. 14, Mall A, 1301, Mall B, 1302, and Mall N, 1304, are Member Malls, while Mall C, 1303, is not a Member Mall.

Figure 15:
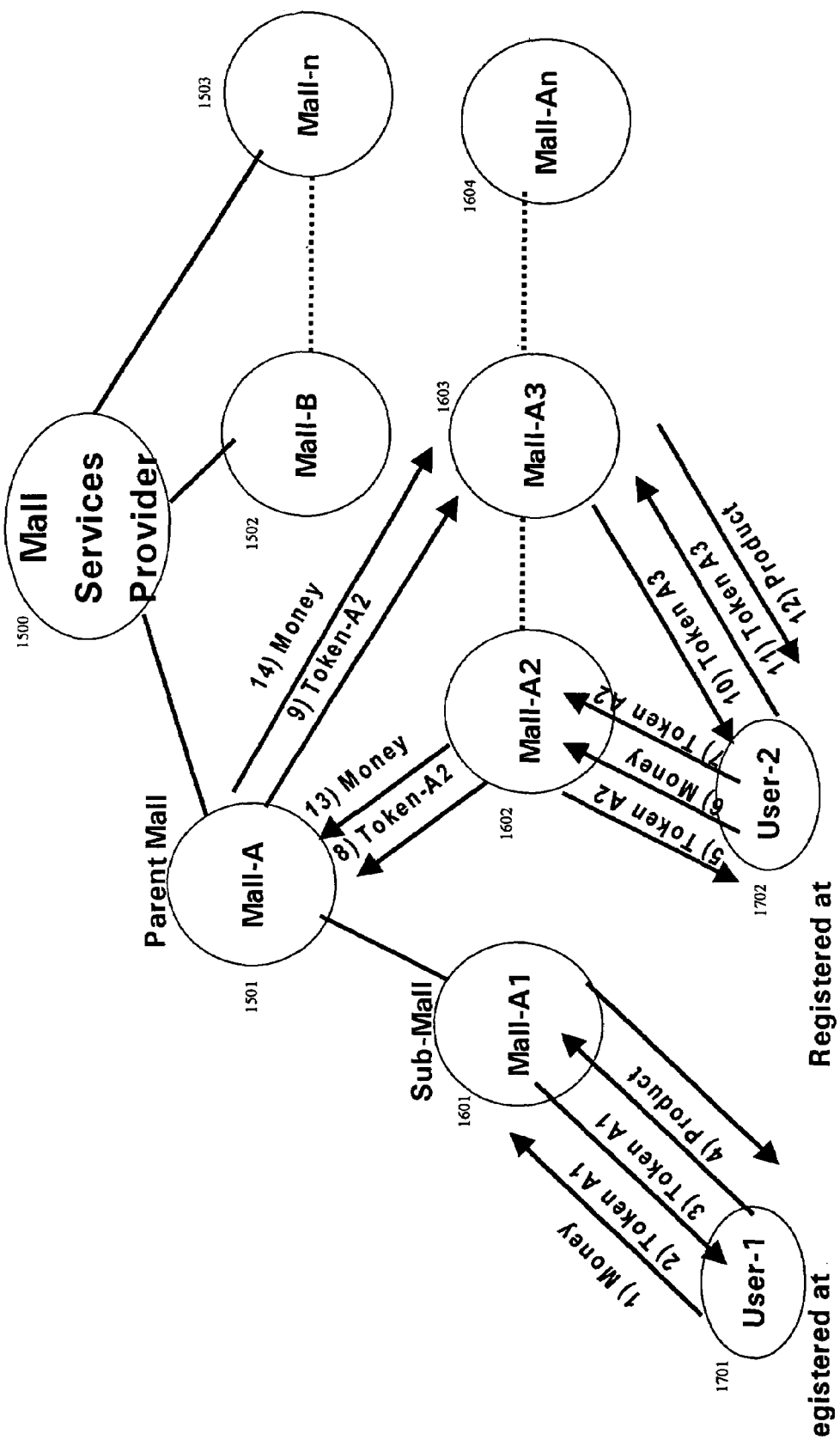
FIG. 15 is an overview of the process in which a user registered at a franchised mall purchases products offered at another franchised mall.

It would be appropriate to say that the method and system as invented becomes an "open" system with the services of the MSP, which provides the exchange of tokens and settlement services among a group of Member Malls, which are "closed" systems. FIG. 15 shows an example of a vendor, who has several franchised stores, each is a vendor by itself. Referring to FIG. 15, each of the solid arrows indicates steps (1)-(14), which represent a transaction in the direction of the arrow. Here, the user 1, 1701, registered at sub-mall Mall-A1, 1601, by purchasing tokens A1 first, then purchased product offered at Mall-A1, 1601, using his Tokens-A1. Steps (1), (2), (3), and (4) show these processes. In FIG. 15, user 2, 1702, requests Mall-A2, 1602, where he registered, to transfer a certain amount of his Token-A2s, to Mall-A3, 1603, from which he is granted an equivalent amount of Token-A3s and purchases products offered at Mall-A3, 1603. This is shown in Steps (7), (8), (9), and (10) for transferring tokens and Steps (11) and (12) for purchasing products. Steps (13) and (14) indicate that Mall-A2 pays Mall-A3 for transferring Tokens-A2 paid by user 2, 1702, to Mall-A3, 1603, for it to grant Tokens-A3 to user 2, 1702. As shown in FIG. 15, since sub-malls, Mall-A1, 1601, Mall-A2, 1602, and all other sub-malls, Mall-A3, 1603, and Mall An, 1604, are all part of franchise stores of the parent mall, Mall-A, 1501, as shown in FIG. 15, the value of tokens for each sub-mall will normally be the same, as determined by the parent company; in this case, Mall-A, 1501. The computer program at Mall-A, 1501, keeps the record of user shopping activities among its sub-malls and provides the payment settlement amount between sub-malls. These services are the same as the services provided by the MSP, described earlier, except that the MSP keeps an additional record of the different values of tokens, set by each individual Member Mall operator.

The method and system as invented, permits a vendor to set any price level for his tokens, it may be desirable, as shown in FIG. 16, that the vendor displays the cost of products or services at his Web site, both in terms of tokens, as well as, in actual case equivalent value. This may help the user to associate the cost more easily. Furthermore, as use of electronic tokens for purchasing products or services at a vendor's Web site is a new concept, the present invention provides the user with a choice to pay for products or services, using tokens or his credit card. Until such time that the user becomes more comfortable purchasing tokens, the vendor may determine that providing a choice between credit card and tokens is no longer necessary as its users become more familiar with the use of tokens and appreciate the benefits of using tokens instead of their credit card.

What is claimed is:

1. A method for conducting electronic commerce transactions with a merchant comprising:
   receiving a request for an electronic commerce transaction with a vendor from a user using a client device;
   registering the user with the vendor;
   determining whether the user has adequate funds to finance the purchase of electronic tokens from the vendor, the electronic tokens being issued and redeemable by the vendor, each of the electronic tokens having a predetermined nominal value;
   selling electronic tokens to the user responsive to the determination of whether the user has sufficient funds;
   storing the purchased electronic tokens in a user account with the vendor;
   determining whether the user has a sufficient number of electronic tokens in the user account to cover a purchase of at least one of a plurality of products or services offered by the vendor;
   enabling the user to order at least one of the plurality of products or services offered by the vendor if a determination is made that the user's account balance contains a sufficient number of electronic tokens;
   enabling the user to make a purchase selection from amongst the plurality of products or services offered by the vendor, the purchase price being set at an integer multiple of the electronic tokens;
   transmitting a confirmation to the user summarizing the electronic commerce transaction; and
   electronically delivering the purchase selection to the user;
   wherein the receiving, determining, selling, storing, enabling, transmitting, and delivering are each performed by a server computer of the vendor.

2. The method of claim 1, further comprising establishing the account.

3. The method of claim 1, wherein the step of electronically delivering includes transmitting an authorization code.

4. The method of claim 1, further comprising:
   requesting account information from the user if a determination is made that the user has no account that permits the user to conduct electronic commerce transactions with the vendor; and
   receiving the account information from the client device.

5. The method of claim 1, further comprising preventing the user from viewing a portion of information relating to the plurality of products or services offered by the vendor if a determination is made that the user has an account balance less than the predetermined amount.

6. The method of claim 1, further comprising preventing the user from viewing a portion of information relating to the plurality of products or services offered by the vendor if a determination is made that the user has no account that permits the user to conduct electronic commerce transactions with the vendor.

7. The method of claim 1, further comprising presenting the user with descriptions of the plurality of products or services.

8. The method of claim 1, further comprising updating the account balance based on the purchase selection.

9. The method of claim 1, further comprising enabling the user to confirm the purchase selection.

10. The method of claim 1, further comprising the step of enabling the user to trade at least some of the electronic tokens with another user.

11. The method of claim 10, wherein the vendor receives a commission from the trade between the users.

12. The method of claim 1, wherein the user provides personal information to the vendor upon the purchase of the electronic tokens, and wherein the personal information is fed into a user database.

13. The method of claim 1, further comprising the step of creating commercial agreements between different vendors, wherein the electronic tokens issued by a first vendor are accepted for payment by a second vendor.

14. The method of claim 13, wherein the electronic tokens are accepted for payment by the second vendor at a discount.

15. The method of claim 13, further comprising the step of establishing an interpayment system between the first and second vendors to account for purchases at the second vendor with electronic tokens issued by the first vendor.

16. The method of claim 13, wherein the user provides personal information to the first vendor upon the purchase of the electronic tokens, wherein the personal information is fed into a user database of the first vendor, and wherein the second vendor has access to the user database.

17. A method for conducting electronic commerce transactions with a vendor comprising:
   registering a user with the vendor;
   determining whether the user has adequate funds to finance the purchase of electronic tokens from the vendor, the electronic tokens being issued and redeemable by the vendor, each of the electronic tokens having a predetermined nominal value;
   selling electronic tokens to the user responsive to the determined adequacy of funds;
   storing the electronic tokens in a user account with the vendor;
   receiving a request for information regarding a selected one of plurality of products or services offered by a the vendor from a user using a client device;
   receiving a request from the user to make a purchase selection from amongst the plurality of products or services offered by the vendor;
   determining whether the user has a sufficient number of electronic tokens in the user account to cover a purchase of at least one of a plurality of products or services offered by the vendor, the purchase price being set at an integer multiple of the electronic tokens;
   enabling the user using the client device to order a plurality of products or services offered by the vendor if a determination is made that the user's account balance contains a sufficient number of electronic tokens;
   transmitting a confirmation to the user summarizing the electronic commerce transaction; and
   electronically delivering the purchase selection to the user;
   wherein the receiving, determining, enabling, transmitting, and delivering are each performed by a vendor server computer.

18. The method of claim 17, further comprising requesting at least one of personal information and payment information from the user.

19. The method of claim 18, further comprising maintaining a record of the electronic commerce transaction.

20. The method of claim 19, further comprising providing a database for storing the record.

21. The method of claim 17, further comprising authenticating the user.

22. The method of claim 17, wherein the description comprises at least one of a title, size, estimated download time, payment information, and price of the item.

23. The method of claim 17, further comprising:
   prior to enabling the user to select an item for purchase from the vendor, enabling the user to identify an account to be used to pay for the purchase; and
   enabling the user to add funds to the account.

24. The method of claim 23, further comprising:
   during enabling the user to add funds to the account, obtaining a credit status for the user; and
   determining whether to approve addition of funds to the account based on the credit status for the user.

25. The method of claim 17, further comprising notifying the user regarding whether the purchase was approved.

* * * * *